(12) United States Patent
Chartrand

(10) Patent No.: US 11,693,652 B2
(45) Date of Patent: Jul. 4, 2023

(54) AUTOMATED AUTHORING OF SOFTWARE SOLUTIONS FROM A DATA MODEL

(71) Applicant: 27 Software U.S. Inc., Mooresville, NC (US)

(72) Inventor: Christopher Zee Chartrand, Brantford (CA)

(73) Assignee: 27 Software U.S. Inc., Mooresville, NC (US)

( * ) Notice: Subject to any disclaimer, the term of this patent is extended or adjusted under 35 U.S.C. 154(b) by 64 days.

(21) Appl. No.: 17/232,487

(22) Filed: Apr. 16, 2021

(65) Prior Publication Data

US 2022/0334834 A1  Oct. 20, 2022

(51) Int. Cl.
*G06F 9/44*  (2018.01)
*G06F 8/73*  (2018.01)
*G06F 8/75*  (2018.01)
*G06F 9/54*  (2006.01)
*G06F 8/35*  (2018.01)
*G06F 8/71*  (2018.01)

(52) U.S. Cl.
CPC .............. *G06F 8/73* (2013.01); *G06F 8/35* (2013.01); *G06F 8/71* (2013.01); *G06F 8/75* (2013.01); *G06F 9/547* (2013.01)

(58) Field of Classification Search
CPC ..... G06F 8/35; G06F 8/71; G06F 8/73; G06F 8/75; G06F 9/547
USPC ......................................................... 717/123
See application file for complete search history.

(56) References Cited

U.S. PATENT DOCUMENTS

| | | |
|---|---|---|
| 6,681,383 B1 | 1/2004 | Pastor |
| 7,062,502 B1 | 6/2006 | Kesler |
| 7,716,591 B2 | 5/2010 | Chen et al. |
| 7,720,872 B1 | 5/2010 | Biere et al. |
| 7,853,922 B1 | 12/2010 | Szpak et al. |
| 7,885,981 B2 | 2/2011 | Kaufman |

(Continued)

FOREIGN PATENT DOCUMENTS

| | | |
|---|---|---|
| CN | 11115917 A | 5/2020 |
| EP | 3557408 A1 | 10/2019 |
| WO | 2021011691 A1 | 1/2021 |

OTHER PUBLICATIONS

Ed-douibi et al., "Model-driven Development of OData Services: an Application to Relational Databases", 2018, 12th International Conference on Research Challenges in Information Science, 12 pages (Year: 2018).*

(Continued)

*Primary Examiner* — Ted T. Vo
(74) *Attorney, Agent, or Firm* — David J. Thibodeau, Jr.; VLP Law Group, LLP

(57) ABSTRACT

Automatically generating code and related artifacts such as application programming interfaces (APIs) and related documentation from an abstract model of a database. The abstract model is derived from a physical model which may be a source such as a legacy database, an entity relationship diagram, or other schema defining the data tables, objects, entities, or relationships etc. of the source. The generated code may be exposed (that is, made visible to the developer in its pre-compiled state) and further configurable and extendable. Any such extended code is maintained separately from generated code. An API and related documentation are also generated from the same abstract model.

22 Claims, 30 Drawing Sheets

(56) References Cited

U.S. PATENT DOCUMENTS

| | | | |
|---|---|---|---|
| 8,010,701 | B2 | 8/2011 | Wilkinson |
| 8,719,781 | B2 | 5/2014 | Agovic et al. |
| 9,244,971 | B1 | 1/2016 | Kalki |
| 10,140,319 | B2 | 11/2018 | Widjanarko et al. |
| 10,853,161 | B2 | 12/2020 | Ahad |
| 11,409,505 | B1 * | 8/2022 | Chartrand .................. G06F 8/35 |
| 2004/0249950 | A1 | 12/2004 | Christensen et al. |
| 2004/0254939 | A1 | 12/2004 | Dettinger et al. |
| 2005/0091227 | A1 | 4/2005 | McCollum |
| 2005/0203940 | A1 | 9/2005 | Farrar et al. |
| 2006/0041877 | A1 | 2/2006 | Harsh et al. |
| 2006/0179025 | A1 | 8/2006 | Bechtel et al. |
| 2007/0011332 | A1 | 1/2007 | Raghavan et al. |
| 2007/0208764 | A1 | 9/2007 | Grisinger |
| 2008/0046462 | A1 | 2/2008 | Kaufman et al. |
| 2009/0083697 | A1 | 3/2009 | Zhang et al. |
| 2009/0313613 | A1 | 12/2009 | Ben-Artzi et al. |
| 2010/0082646 | A1 | 4/2010 | Meek et al. |
| 2010/0138398 | A1 | 6/2010 | Yoshizawa et al. |
| 2010/0313182 | A1 | 12/2010 | Chen et al. |
| 2011/0088011 | A1 | 4/2011 | Ouali |
| 2012/0124550 | A1 | 5/2012 | Nocera et al. |
| 2012/0311345 | A1 | 12/2012 | Dhuse et al. |
| 2013/0145348 | A1 | 6/2013 | Agovic et al. |
| 2013/0185362 | A1 | 7/2013 | Clagg et al. |
| 2014/0280047 | A1 | 9/2014 | Shukla et al. |
| 2014/0289702 | A1 | 9/2014 | McMahon et al. |
| 2015/0067641 | A1 | 3/2015 | Nyisztor et al. |
| 2015/0120729 | A1 | 4/2015 | Slade |
| 2015/0205594 | A1 | 7/2015 | Pruessmann et al. |
| 2016/0026461 | A1 | 1/2016 | Bannister et al. |
| 2016/0132298 | A1 | 5/2016 | Chalasani |
| 2016/0313983 | A1 | 10/2016 | Davidchuk et al. |
| 2016/0342397 | A1 | 11/2016 | Goetz |
| 2017/0161138 | A1 | 6/2017 | Oleynikov et al. |
| 2018/0036795 | A1 | 2/2018 | Behr et al. |
| 2018/0129988 | A1 | 5/2018 | O'Connell |
| 2019/0012354 | A1 | 1/2019 | Wakana et al. |
| 2019/0155225 | A1 | 5/2019 | Kothandaraman et al. |
| 2019/0182120 | A1 | 6/2019 | Coccia |
| 2019/0228552 | A1 | 7/2019 | Lee |
| 2019/0236282 | A1 | 8/2019 | Hulick et al. |
| 2019/0266170 | A1 | 8/2019 | Hazel et al. |
| 2019/0340287 | A1 | 11/2019 | Tamjidi et al. |
| 2020/0106658 | A1 | 4/2020 | Chandrasekhar et al. |
| 2020/0137097 | A1 | 4/2020 | Zimmermann et al. |
| 2020/0242532 | A1 | 7/2020 | Kawamoto et al. |
| 2020/0257614 | A1 | 8/2020 | Davis et al. |
| 2020/0341970 | A1 | 10/2020 | Rodrigues |
| 2020/0387372 | A1 | 12/2020 | Kalavathy et al. |
| 2021/0170693 | A1 | 6/2021 | Sinclair |

OTHER PUBLICATIONS

SAP Hana, "SAP HANA Developer Guide for SAP HANA XS Advanced Model", 2019, SAP SE, 1270 pages (Year: 2019).*

Rosenmuller et al., "Code Generation to Support Static and Dynamic Composition of Software Product Lines", 2008, ACM, 10 pages. (Year: 2008).*

Manaranka, Irene, "Your Guide to Data Quality Management", Data Analytics, 15 pages (2020).

Gill, Jagreet Kaur, "Machine Learning Observability and Monitoring", Published by akira.ai/blog, 5 pages (2020).

Non-Final Office Action dated Jul. 8, 2021 mailed from the USPTO in related U.S. Appl. No. 17/232,444.

Notice of Allowance dated Feb. 18, 2022 received in related U.S. Appl. No. 17/232,444.

Non-Final Office Action dated Mar. 15, 2022 received in related U.S. Appl. No. 17/232,520.

Spalka, "A Comprehensive Approach to Anomaly Detection in Relational Database", Data and Applications Security LNCS 3654, pp. 207-221, FIP International Federation for Information Processing (2005).

IBM, "Data Modeling", IBM Cloud (2020).

Final Office Action dated Oct. 21, 2021 mailed from the USPTO in related U.S. Appl. No. 17/232,444.

Notice of Allowance dated Jun. 29, 2022 received in related U.S. Appl. No. 17/232,520.

"Application Modernization" White Paper, DXterity Solutions, pp. 1-10, (2019).

International Search Report and Written Opinion dated Aug. 16, 2022 for Related PCT/US22/24937.

* cited by examiner

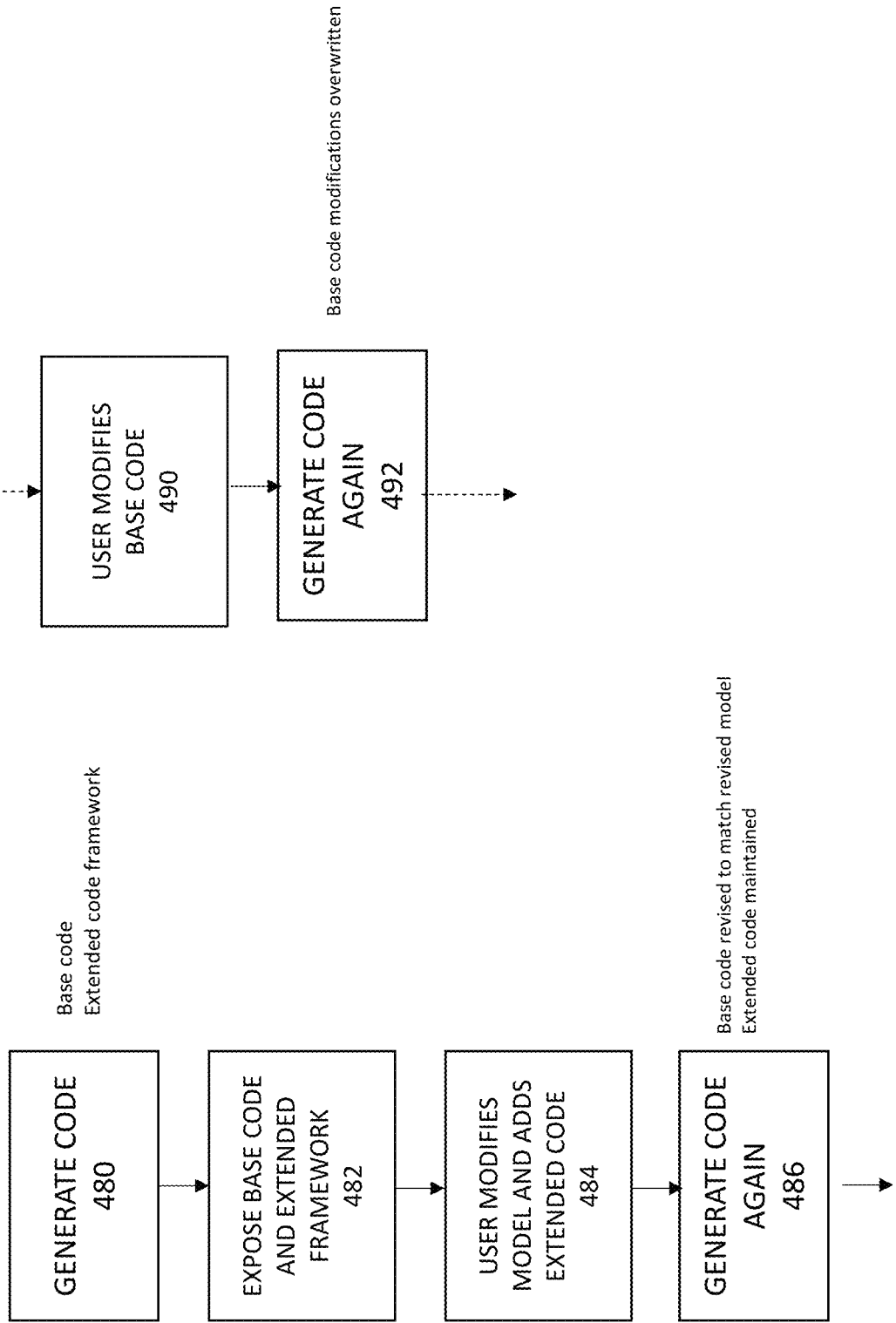

```
374  #region Entity Data Values
375  /// <summary> A list of attorney role values.
378  public enum AttorneyRole
379  {
380      /// <summary>Lead</summary>
381      Lead = 1,
382      /// <summary>Support</summary>
383      Support = 2,
384  }
385  /// <summary> A list of client role values.
388  public enum ClientRole
389  {
390      /// <summary>Manager and primary contact</summary>
391      Coordinator = 2,
392      /// <summary>Technical Lead</summary>
393      TechnicalLead = 1,
394  }
395  #endregion Entity Data Values
396
397  } //Namespace
```

AUTOMATED AUTHORING OF SOFTWARE SOLUTIONS FROM A DATA MODEL

CROSS REFERENCE TO RELATED APPLICATIONS

This application is related to two co-pending U.S. patent applications entitled "Automated Authoring of Software Solutions by First Analyzing and Resolving Anomalies in a Data Model" and "Automated Authoring of Software Solutions From a Data Model with Related Patterns", each of which are filed on the same day as this application, and each of which are hereby incorporated by reference.

BACKGROUND

The world is undergoing a digital transformation; using data to enable enterprises to become faster, cheaper, smarter and more convenient to customers. Companies, schools, churches, and governments around the world are collectively investing trillions of US dollars each year in technology to become more competitive and more profitable.

High quality software applications are core to a successful digital transformation. Here are some types of software projects that are part of nearly every such process:

New software applications and prototyping: Quickly-built prototypes of software programs initially prove that new business models can work. The prototypes are typically then re-written into much larger and scalable enterprise software applications. New software applications that are often used to disrupt older business models and large applications can take 18-24 months to construct using teams of developers.

Legacy software programs: Millions of decades-old programs are expensive to maintain and the programmers who built the programs have either died or retired, making it risky to touch, change, or upgrade those legacy software applications without experienced staff on hand. Old programs within a company's production environment create security vulnerabilities, are challenging to move to the cloud environment, and are prone to break, threatening a company's ongoing operations every day. The legacy applications must be replaced.

Integration: Software programs need to talk to other software programs more than ever before. To communicate and share data they use software apps, APIs (application programming interfaces), which are complex and specialized, requiring significant time to build.

Unfortunately, there are impediments and bottlenecks to digital transformation efforts. These barriers reduce productivity and reduce the quality of the software applications/programs that are produced. Some of the more important ones are:

Shortage of software developers: There is an estimated shortage of 1 million experienced programmers in North America. Companies are held hostage by lack of talent; productivity suffers, long delays to complete projects, growing backlogs of projects obstruct competitiveness and profitability.

Software development process: The process to develop software has not changed in decades. At the core, software programs are built through writing code "by hand". By its nature, this process is inefficient and lacks excellent tools and lacks adherence to common standards, run by individual developers who act more as "artists" who code in their own style.

Object-relational mapping (ORM) is a programming technique for converting data between incompatible type systems using object-oriented programming languages. ORM creates, in effect, a "virtual object database" that can be used from within the programming language.

In one application of ORM, many popular database products such as SQL database management systems (DBMS) are not object-oriented and can only store and manipulate scalar values such as integers and strings organized within tables. ORM tools can be used to translate the logical representation of the objects into an atomized form that is capable of being stored in a relational database, while preserving the properties of the objects and their relationships so that they can be reloaded as objects when needed.

U.S. Patent Publication 2011/0088011 provides a system and method for automatically generating enterprise software applications with minimal level of manual coding. A graphical design tool models an application using a Unified Model Language (UML), validates the UML model, and automatically generates a deployable application. A framework of libraries can supply a base from which the target application can be built.

International Patent Publication WO2021/011691 describes how database entries and tools for accessing and searching the database are generated from an Ontology. Starting with an ontology used to represent data and relationships between data, the system and methods described enable that data to be stored in a desired type of database and accessed using an API and via a search query generated from the Ontology. Embodiments provide a structure and process to implement a data access system or framework that can be used to unify and better understand information across an organization's entire set of data. Such a framework can help enable and improve the organization and discovery of knowledge, increase the value of existing data, and reduce complexity when developing next-generation applications.

US Patent Publication 2012/179987 provides a computationally efficient system and method for developing extensible and configurable Graphical User Interfaces (GUIs) for database-centric business application product lines using model driven techniques and also reduces the cost as well as time for creating new GUIs for the same which enables effective maintenance and smooth evolution using model driven technique. Modeling of commonality and variability of GUIs leads to a single GUI for the database-centric business application product lines. A model-based solution addresses extensibility and configurability of both structural and behavioral aspects in the GUI and it also supports realize variations at runtime in the presentation layer by using variable fields which can check the configuration data from a configuration database and decide whether to render itself or not.

SUMMARY OF PREFERRED EMBODIMENTS

This patent relates to techniques for automatically generating code and related artifacts such as application programming interfaces (APIs) and related documentation from an abstract model. The abstract model is generated from a source such as a legacy database, an entity relationship diagram, or other schema defining the data tables, objects, entities, or relationships etc. in the source.

The approach may be used to generate code representing an enterprise grade solution from the model. The code may be exposed (that is, made visible to the developer) in its pre-compiled state. The generated code is therefore configurable and extendable via a user interface. Any such extended code is maintained in a structure (such as a file or folder) separately from where the generated code is stored. The extended code structure serves as a location for later placement of developer code.

In one particular aspect, an API and related documentation are also generated from the abstract model. This may include a fully hydrated, standardized API (such as a GraphQL or Rest or OData compliant API).

There are many advantages to this approach. It generates a complete application including code, an API, and related UI documentation, in a form that is automatically structured in the same way that a competent senior developer would structure. As a result, developer effort and time are greatly reduced, with a vast improvement in quality control and standardization of the resulting code. These improvements reduce long term maintenance costs. Because the abstract model is exposed to the developer, the application may be continuously modified, while it is deployed to the end user, and such modifications will automatically propagate to the generated code.

In one particular use case, the system consumes a physical model of a data source, such as a database for a legacy application. An abstract model is generated from the physical model. The system then analyzes the abstract model and generates resulting executable code and metadata that corresponds to the abstract model. The legacy database application may take any form (such as MySQL, SQL Server, DB2, Oracle, Access, Teradata, Azure, PostgreSQL, etc.), and the generated code result may be any of several selectable enterprise class frameworks (such as .Net, .Net Core or Java, etc.). Other use cases are possible.

The generated code may include core code (such as code that implements business rules common to typical enterprise class solutions). The core code (together with other external libraries) may provide a foundation upon which the developer's application-specific logic is generated. The generated solution therefore may contain core code and external libraries as well as the solution-specific components such as application logic, web API, web UI, documentation, unit tests, and the like.

The output may be instantiated on premises, containerized using dockers, or deployed on a cloud platform, to expose the solution logic. This then enables the developer to manually extend or customize the logic with specialized business rules or enhancements to a related UI or API. Any such extended code logic (or UI or API) is maintained separately from automatically generated code.

Also, by placing and maintaining extended code in a file, folder, framework or other structure that is separated from where the generated code is stored, any changes made to the abstract model which is then used for regeneration of the code will not overwrite or otherwise affect or lose any of the extended, customized code.

Generated granular entity level micro-API's (such REST, OData, or GraphQL) may work as a microservices layer to operate on the data. These micro data centric APIs in conjunction with developer defined business or functional rules may be exposed for any front end (UI/UX) to further facilitate customizing the end user interface.

BRIEF DESCRIPTION OF THE DRAWINGS

Additional novel features and advantages of the approaches discussed herein are evident from the text that follows and the accompanying drawings, where:

FIG. 4B is an example flow for how regeneration may affect base code differently from extended code.

FIGS. 12A, 12B and 12C are a more detailed example code that implements a "project" entity.

FIG. 13 is an example of enumerated values implemented in the code.

FIG. 17 shows extended code stored separately from the automatically generated code.

FIG. 22 illustrates an example GraphQL API and its generated documentation.

FIG. 23 is similar to FIG. 22 and shows another documentation example.

FIG. 24 is an example OData API.

DETAILED DESCRIPTION OF ILLUSTRATIVE EMBODIMENT(S)

I. System Overview

Figure 1:
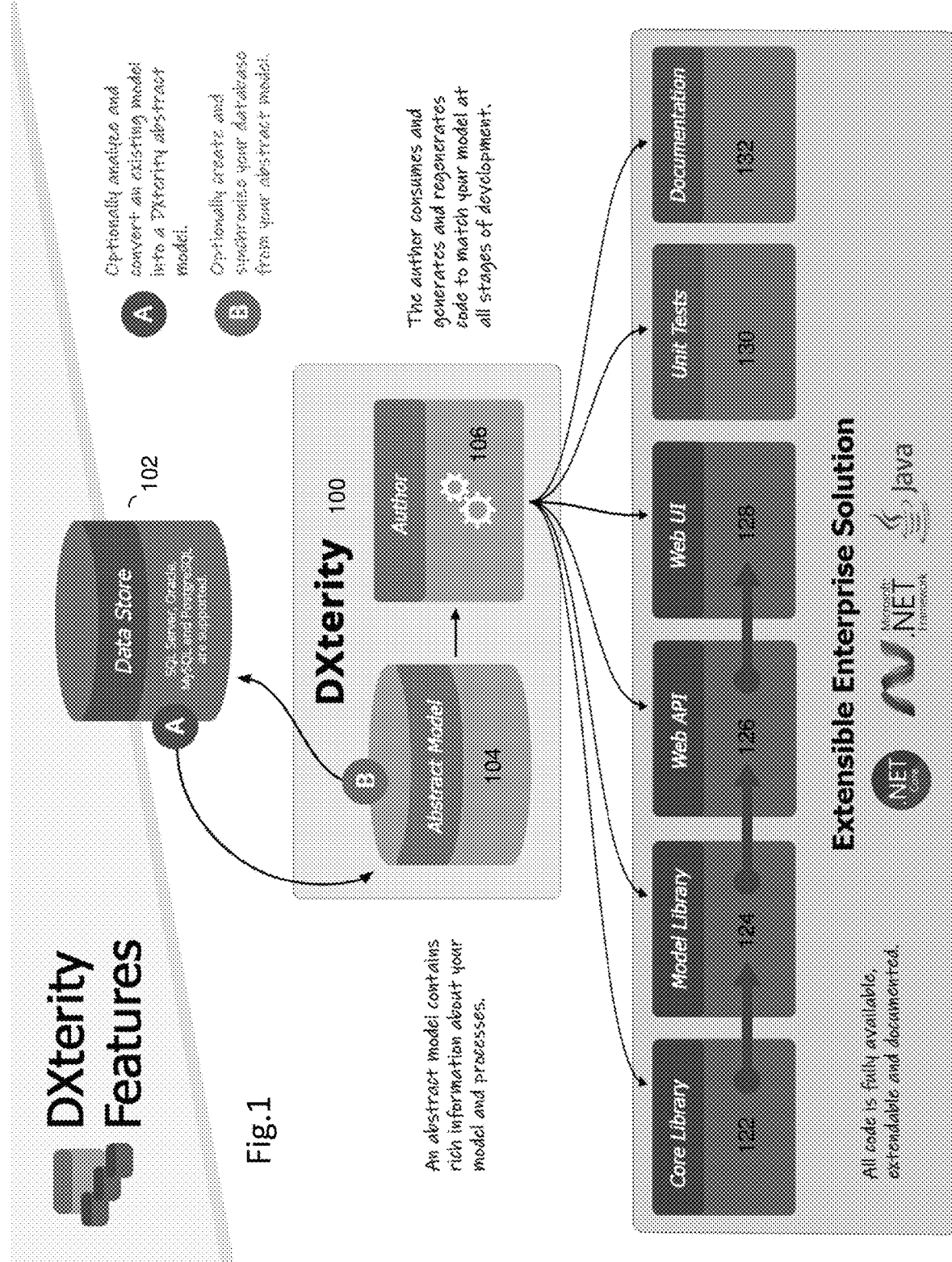
FIG. 1 is a high-level diagram of the features of an example platform for automatic code generation.

As explained above, the present invention relates to a system and methods that may consume a data source and transform it into an abstract model. The abstract model may be extended and then automatically translated into generated base code, Application Programming Interfaces (APIs), User Interfaces (UI), documentation, and other elements.

Each of the generated base code, generated base APIs and generated base UIs may be extended. Extended elements are maintained in a framework, such as a different source code file, separately from generated based code elements.

Of specific interest herein is that attributes, properties and other decorations may be applied and revised to the entities and relations in the abstract model. Code may then be automatically re-generated without disturbing any extended or customized code. This enables late binding on such decorations that may be stored in a configuration file. In other words, the UI and even attributes and properties of entities may be re-generated and deployed continuously and dynamically.

The data architect, developer, or other user of the DXterity platform may choose a desired language or architecture of the API (e.g., OData, GraphQL, or REST). Similarly, code for the UI may be generated as JavaScript or in some other available language.

The generated documentation may take the form of an English or other spoken language interpretation of the generated code. For example, the documentation may consist of interpreted GraphQL.

An example implementation will now be described and shown, starting with FIG. 1. Here a data source, such as data store 102, is made available to a code generation tool or platform 100 (also referred to herein as the DXterity platform). The data store 102 may for example be a database associated with a legacy software application. The data store 102 may be in any common form such as MySQL, SQL Server, DB2, Oracle, Access, Teradata, Azure, PostgreSQL or the like. The DXterity platform 100 is used to generate an abstract model 104 from the input data store 102. The abstract model 104 is then fed to an author 106. The author 106 automatically consumes the model 104 to generate and regenerate code to match the model 104. The author may generate the code in certain forms, and also generate other artifacts related to the model 104. For example, the author 106 may generate or use a core code library 122 and model library 124. But the author may also generate application base logic, a web application interface 126, a user interface 128, unit tests 130, and documentation 132 from the abstract model. The input source may describe the data in a database in other ways, such as via an entity relationship diagram, as explained in more detail below.

The abstract model is generated in a particular way to help ensure that the resulting code 122, 124 conforms to expected criteria. For example, DXterity 100 may be configured to ensure that the resulting generated code and artifacts 122-132 provide an extensible, enterprise-class software solution with late binding on UI and API elements. As will be understood from the discussion below, this is accomplished by ensuring that the abstract model itself conforms to certain metrics or conventions prior to code generation.

Enterprise class software, is computer software used to satisfy the needs of an organization rather than individual users. Enterprise software forms integral part of a computer-based information system that serves an organization; a collection of such software is called an enterprise system. These enterprise systems handle a chunk of data processing operations in an organization with the aim of enhancing the business and management reporting tasks. The systems must typically process information at a relatively high speed and may be deployed across a variety of networks to many users. Enterprise class software typically has, implements or observes many of the following functions or attributes: security, efficiency, scalability, extendibility, collaboration, avoidance of anti-patterns, utilization of software patterns, architected, designed, observes naming and coding and other standards, provides planning and documentation, unit testing, serialized internal communication, tiered infrastructure, exception management, source code and version control, and includes interfaces for validation, messaging, communication, cryptography, localization, logging and auditing.

Figure 2:
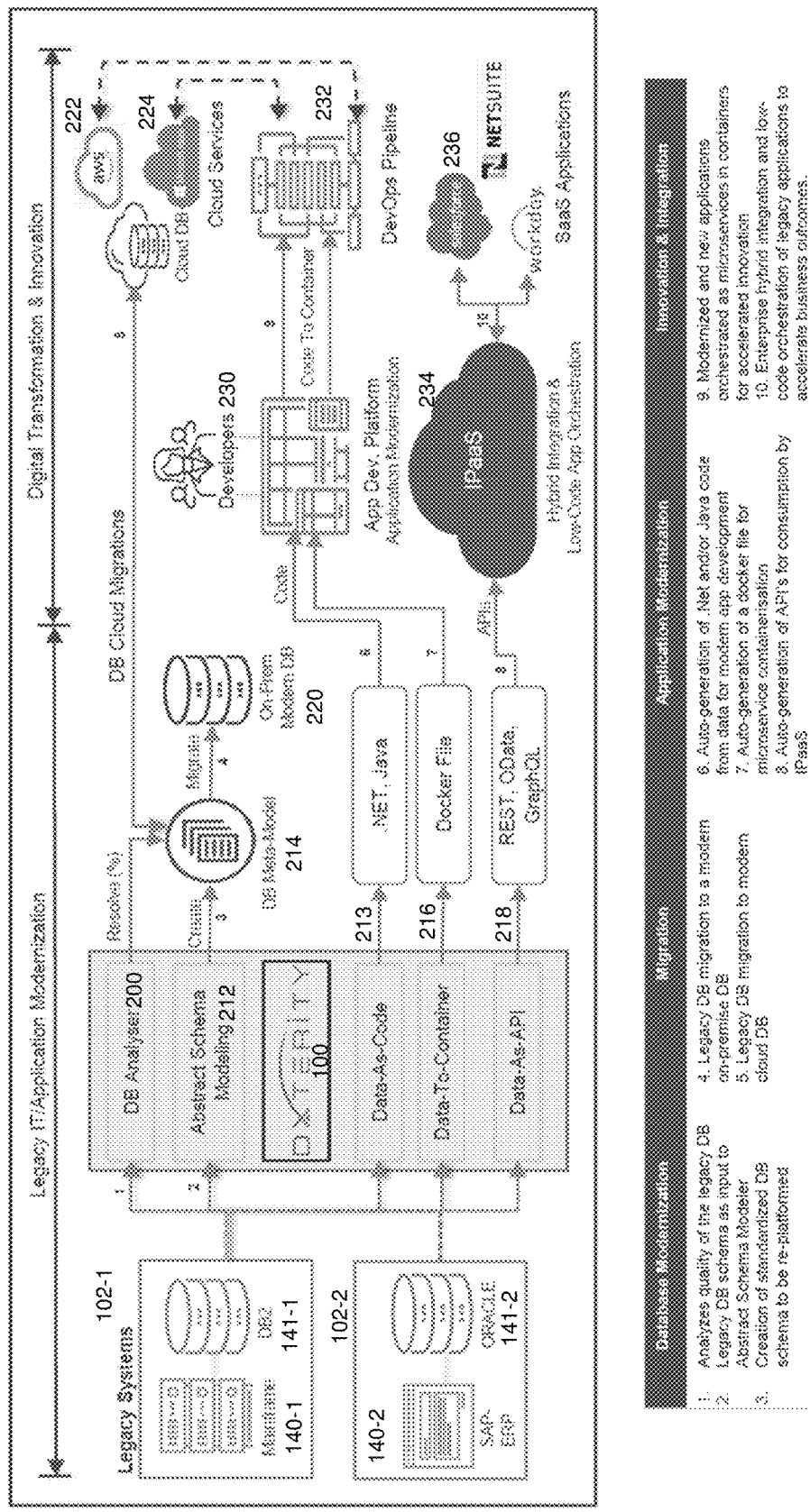
FIG. 2 is a more detailed view of an example platform.

FIG. 2 illustrates an example implementation in a bit more detail than FIG. 1. Here there are two input data stores 102-1, 102-2, respectively associated with two legacy systems including an IBM mainframe 140-1 running a DB2 instance 141-1 and an SAP/ERP application accessing an Oracle database 141-2.

The DXterity platform 100 consists of an analyzer component 200 and a schema modelling component 212. The schema modelling component 212 generates abstract models of the legacy databases 141-1, 141-2.

The analyzer component 200 analyzes the abstract models of the legacy databases 141-1, 142-2 against selected metrics, generates a score, and recommends resolutions to improve the scores.

A standardized database schema is then output from DXterity 100 as a meta model 214. The meta model 214 may then be re-platformed in various ways. For example, it may be migrated to an on-premise modern database 220. Or the meta model may be migrated to a cloud provider 222 or as a cloud service 224.

Artifacts generated by DXterity 100 may also be fed to other related functions, including an application development platform 230 that drives DevOps pipelines 232, or integration/orchestration environments 234 that support specific application development platforms 236.

Also, of interest is that the DXterity platform 100 may be used to generate its result as data-as-code (e.g., as .NET, or Java), data-to-container (e.g., as a Docker file), or data-as-API (REST, OData, GraphQL, etc.).

II. Characteristics of the Code Authored from the Abstract Model

Figure 3:
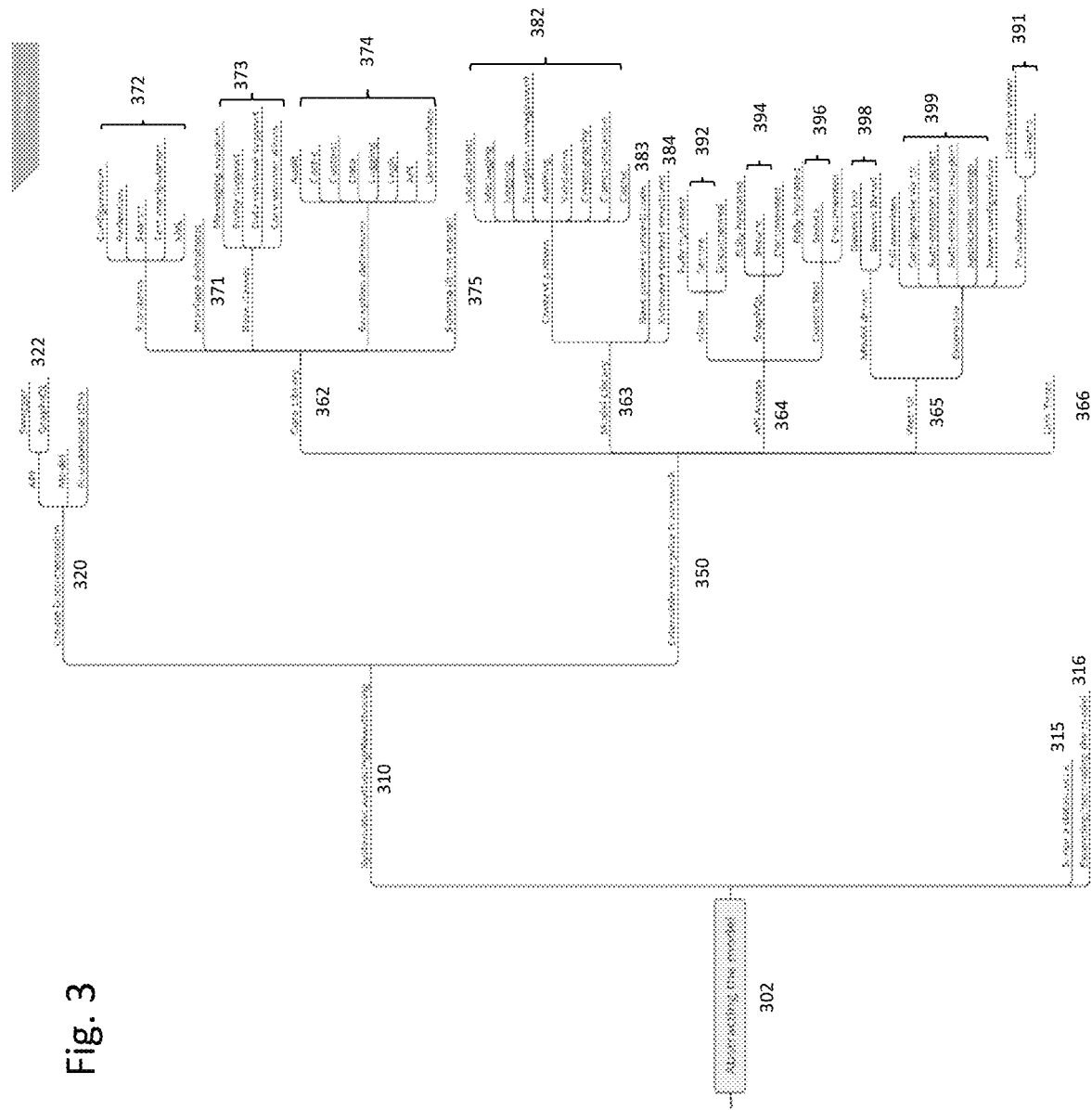
FIG. 3 is a diagram illustrating a hierarchy of functions performed on an abstract model to generate code as an extensible enterprise-class framework, Application Programming Interface (API), User Interface (UI) and related documentation.

FIG. 3 is one example of a hierarchical list of the functions, structures, and concepts that may be performed or authored by the DXterity platform 100.

An abstracting function 302 takes the physical model and generates an abstract model.

From the abstract model, then systematic authoring/re-authoring functions 310 may proceed. Systematic authoring 310 consists of automatically generating the extensible enterprise framework as executable code 350 as well as creating the related documentation 320.

Other functions or operations such as scripting a data source or extending 315 and decorating 316 may also be performed on the abstract model.

The generated extensible framework 350 architects the authored (generated) code in a particular way. More specifically, the code generated may be arranged into a core library 362, model library 363, API access 364, web UI 365 and unit test 366 elements.

In an example implementation, the core library 362 may further include code grouped as assistant functions 372 (including configuration parameters, reflectors, search, text manipulation, and XML), interface definitions 371, base classes 373 (including messaging support, entity support, data retrieval support, or core enumerations), exception definitions 374 (including audit, cache, custom, data, login, logic, API, and user interface, as well as schema definitions 375.

The model library 363 may involve generating context patterns 382 (including localization, messaging, logging, exception management, authoring, validations, cryptography, communication and caching), base code 383, and extended structures 384.

API access 364 may be generated in any of several API formats including OData 392, GraphQL 394, or REST 396 each of which may be accordingly hydrated, secure and documented.

The generated web UI 365 artifacts are also driven 398 from the abstract model in which case generic list and generic details are provided; or they may be extensible 399 (including overrides, configurations, authorization and authentication support with application settings 399 and/or model configurations and/or visualizations 391.

Figure 4A:
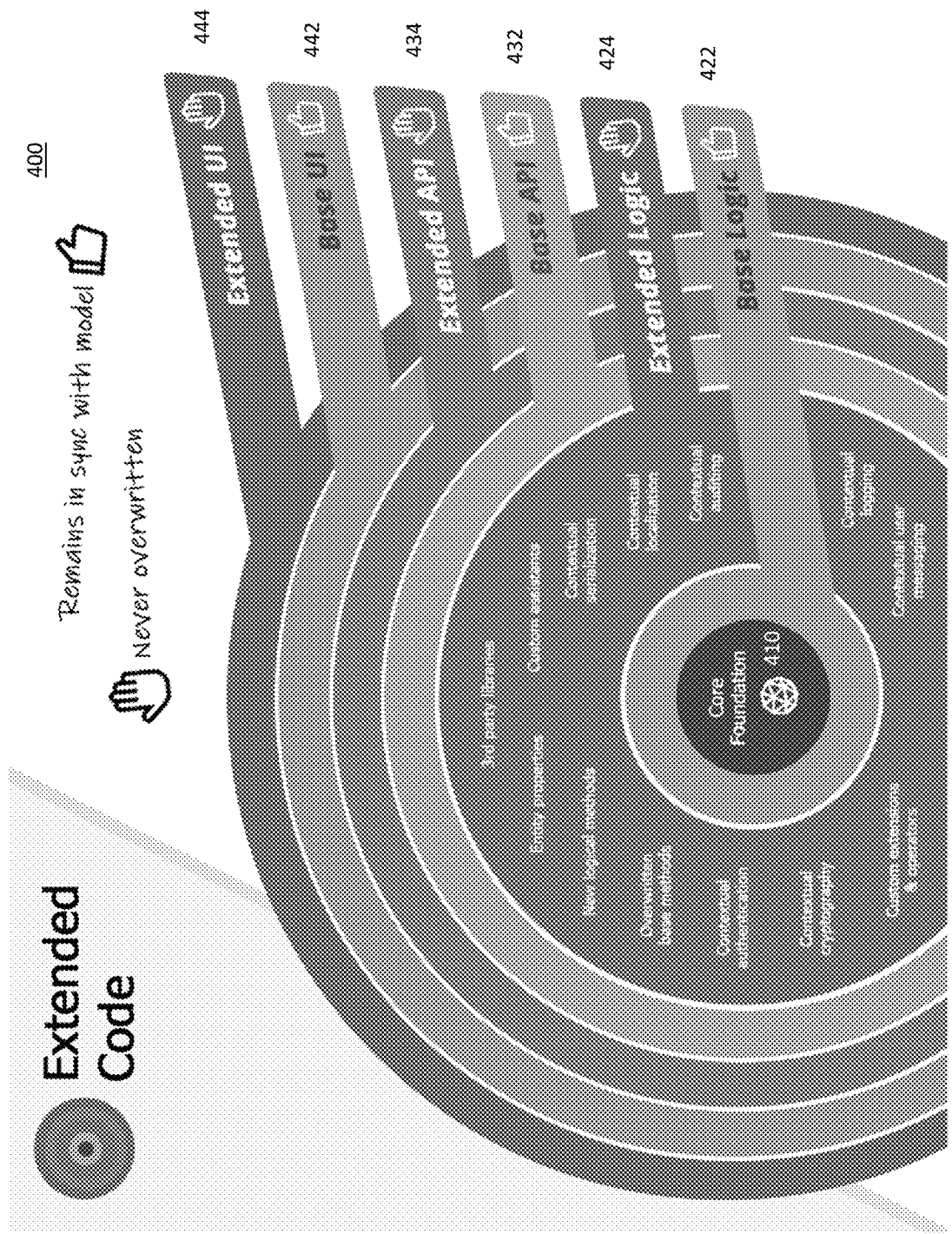
FIG. 4A is a conceptual diagram illustrating how the resulting code is arranged in a hierarchy of files including core, base and extended logic, base and extended APIs, and base and extended UIs.

FIG. 4A illustrates the hierarchy of the generated code. More particularly, the generated code is divided into a core code foundation 410, and application-specific logic including base logic 422 and extended application logic 424. API code is also arranged as base API code 432 and extended API code 434. Web UI code similarly includes base UI code 442 and extended UI code 444. The different code elements including base application logic 422 and extended application logic 424 are stored separately from one another, such as in different files. Similarly, base 432 and extended 434 API code are stored separately from one another, as are Web UI base 442 and extended 444 elements.

As mentioned previously, the core code 410 consists of elements that are used by more than one application or solution. For example, the core code may include common libraries and similar functions.

The base components specific to the application, such as base logic 422, base API 432 and base UI 442 are automatically generated from the abstract model and always remain in sync with the model. Therefore, even though the developer is permitted to view and even edit the base application code 422, base API code 432 and Web UI base code 442, these base components will be rewritten whenever the developer requests code to be re-generated from the model.

The generated structures (or frameworks) may be used by the developer for placement of extended code including extended application code 424, extended API code 434 and extended Web UI code 444. These frameworks may thus be exposed to a developer for review (such as a data architect) and also made available for modification. These extended code elements, once modified, are not permitted to be overwritten by any subsequent automated regeneration of code. However, in some implementations, the extended code elements may be permitted to be overwritten before any developer modifications are made to them. In some implementations, extended UI code may be stored in a configuration file to, for example, enable late binding as explained elsewhere.

As also shown in FIG. 4A, patterns implemented by the extended code components may include a variety of methods and properties supplied by the developer. As the figure suggests, these may include overwritten base methods or entity properties, third party libraries, new logical methods, contextual serialization or context localization, contextual cryptography authentication, contextual user messaging, logging, auditing, custom extensions or operators. Again, these may be stored as part of the extended logic 424 or other components such as extended API 434 or extended Web UI 444.

As can now be appreciated, an example flow might be as shown in FIG. 4B. At step 480, the model is used to generate base application code that is stored separately from an extended application code structure. The base application code and extended application code structure are then exposed at 482 for access by and review by the developer. Modifications and/or additions may also be made by the developer to extended application code structure at 484. Also at this stage, the developer may even directly modify the base application code that was generated from the model at 484. Indeed, the developer may even decide to modify the model at this stage.

However, subsequent regeneration of code at step 486 based on the model will generate new base application code from any revisions to the model, thus overwriting any modifications that the developer had directly made to the base code. The code regeneration step preferably will, however, be prevented from overwriting any modifications the developer made to the extended code.

Note too that at some later time (step 490) the user may modify the base application code directly. After another code generation step 492, any modifications made to the base code in step 490 will be overwritten. This then ensures that the base code always conforms to the model—and does not include any modifications made directly to the base code by the developer.

III. Physical Model Sources and Examples

Figure 5:
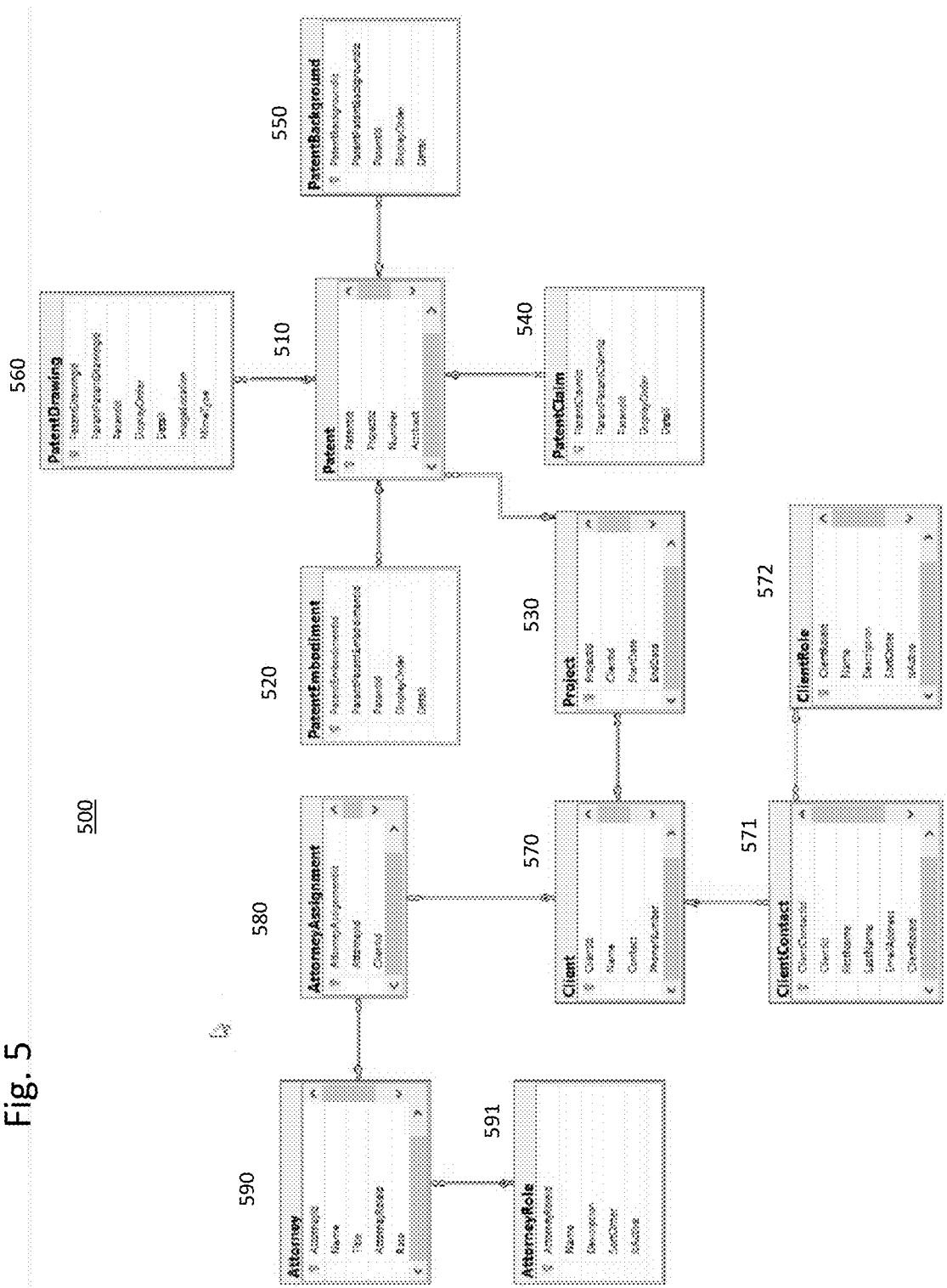
FIG. 5 is an example physical model as may represent a source database.

FIG. 5 is an example of a physical model 500 provided as input to the DXterity platform 100. The physical model 500 may originate in a number of ways. For example, it may be generated by an entity relationship graphical tool such as Cacoo or ERDPlus. In other instances, the physical model may be generated from existing legacy database code. In one example, the legacy database is an Oracle database running on an IBM mainframe, and the DXterity platform 100 may include data discovery components capable of interpreting the physical legacy database such as Oracle SQL Developer or Dataedo. In still other instances, a diagram or other representation of the physical model may originate by hand on a whiteboard or paper that are then used to specify tables and other attributes of the abstract model.

The diagram of FIG. 5 represents data stored in the database and relationships between data. In other words, the diagram is illustrative of the logical structure of the data including real world entities, their attributes and relationships among entities. As is well known, the diagrams are translatable into tables which may be used to build a database.

This example physical model 500 supporting a patent/legal operation where attorneys are performing projects for clients where the projects consist of preparing patents. The physical model 500 thus consists of attorney entities 590, project entities 530, patent entities 510 and client entities 570.

An example entity such as the patent entity 510 has attributes including a patent identifier, a project identifier, a patent number, an abstract, and so forth.

The patent entity 510 also has relationships with a project 530, patent claims 540, a patent background 550, patent drawings 560, and patent embodiment 520. The attorney entity may also be related to an AttorneyRole 591 and, AttorneyAssignment 580. The Client entity 570 may have related ClientContact 571 entity and ClientRole 572 entity.

In another example application, such as one used by a university, database entities might be provided for students, courses, and instructors. Entities are represented by their properties which are also sometimes called attributes. The student entity could have attributes such as a student ID number, student name, and department ID, with the student entity having relationships with courses and instructors. Attributes may have separate values. For example, a student entity might have a name, age, and class year as attributes.

An example student relation may indicate that a student named "Tom Smith" is taking a course called "organic chemistry" being instructed by "Professor Jones".

IV. Abstract Model View, Properties and Attributes

Figure 6:
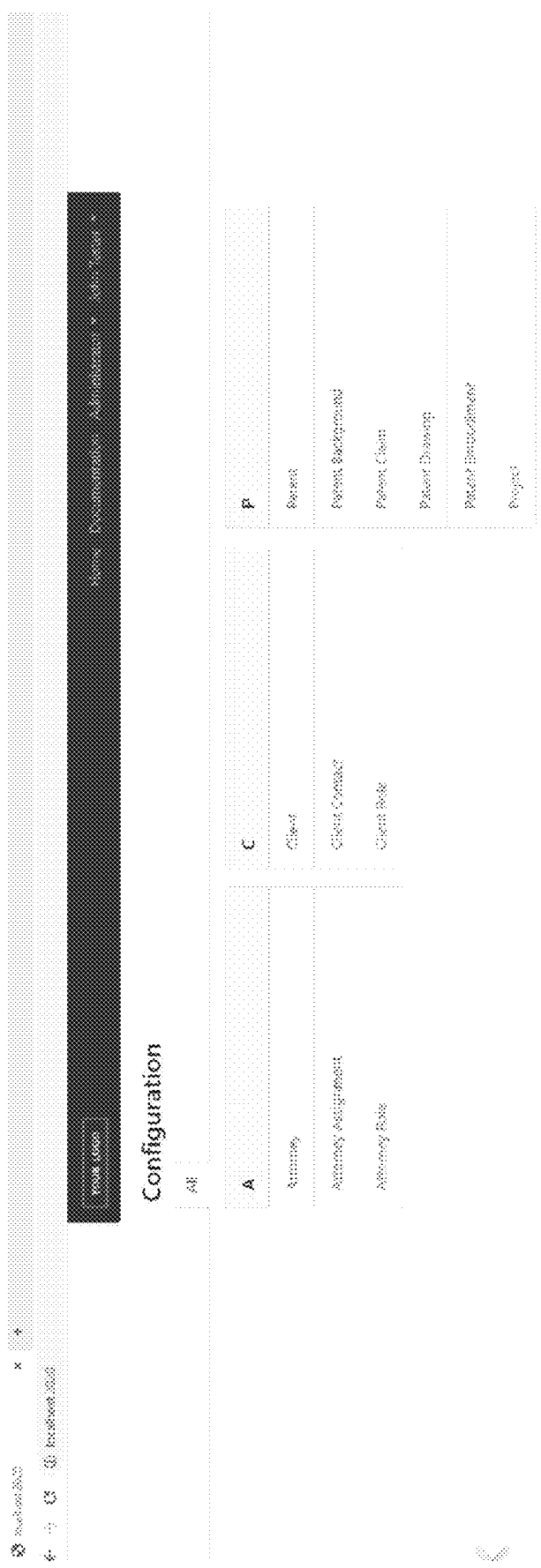
FIG. 6 is a high-level view of the resulting abstract model generated from the physical model.

As was mentioned in connection with FIG. 1, the physical model 500 is submitted to the DXterity platform 100 which then generates an abstract model 104. At this point, the developer who may be a database architect is presented with a user interface such as shown in FIG. 6 to view the abstract model 104. Note that each of the entities of FIG. 5 are represented in the user interface at a high-level. At this point, the developer may click on one of these entities to examine more information about its attributes and relationships.

Figure 7:
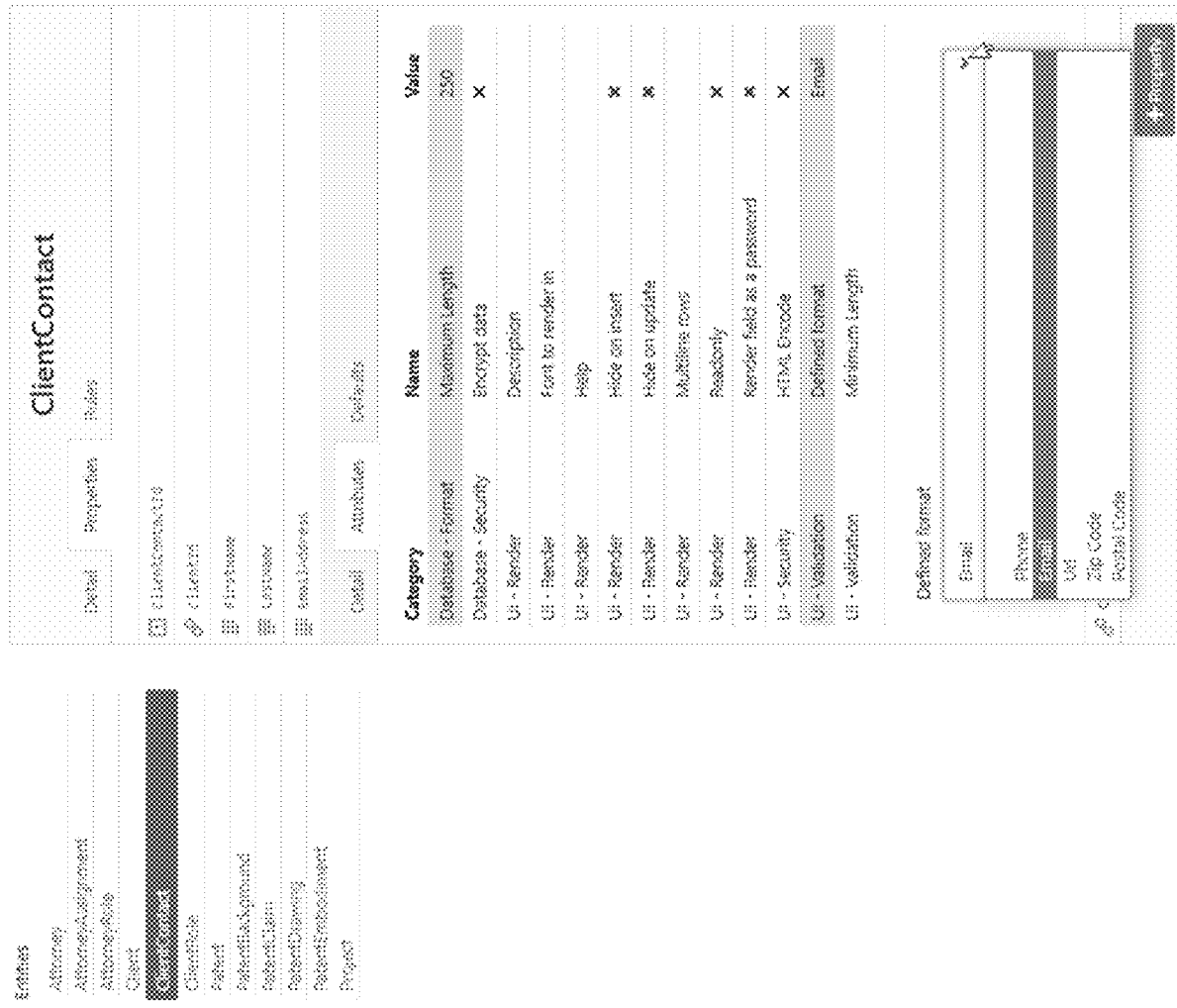
FIG. 7 is an example of how a developer may set attributes, properties, or rules within the platform.

FIG. 7 is an example where the developer has clicked on the ClientContact entity and is now presented with more details of that entity. For example, the developer may see that it has a client contact ID attribute, and that it has a relationship with a client ID. The ClientContact entity also has attributes such as a first name, last name and email address. The ClientContact has decorations and properties such as a format property as "being limited to 250 bytes", and a security property of "not encrypted". Other examples are possible.

Also, important to note here is that the attributes associated with the ClientContact entity may include user interface attributes. These may include attributes of how to render the entity in a user interface (such as the font to use, or whether it should be hidden on insert or update, or whether a help field is displayed), whether it is read only or consists of multiple rows. Other attributes may pertain to how the UI may handle input validation. For example, selected input attributes may be required to have a certain minimum length or format (such as a password, or such as an email address field must have a proper format with an "@" and a "."). Still other attributes may relate to security within the context of the UI (e.g., it must be rendered in the UI via encoded HTML).

Figure 8:
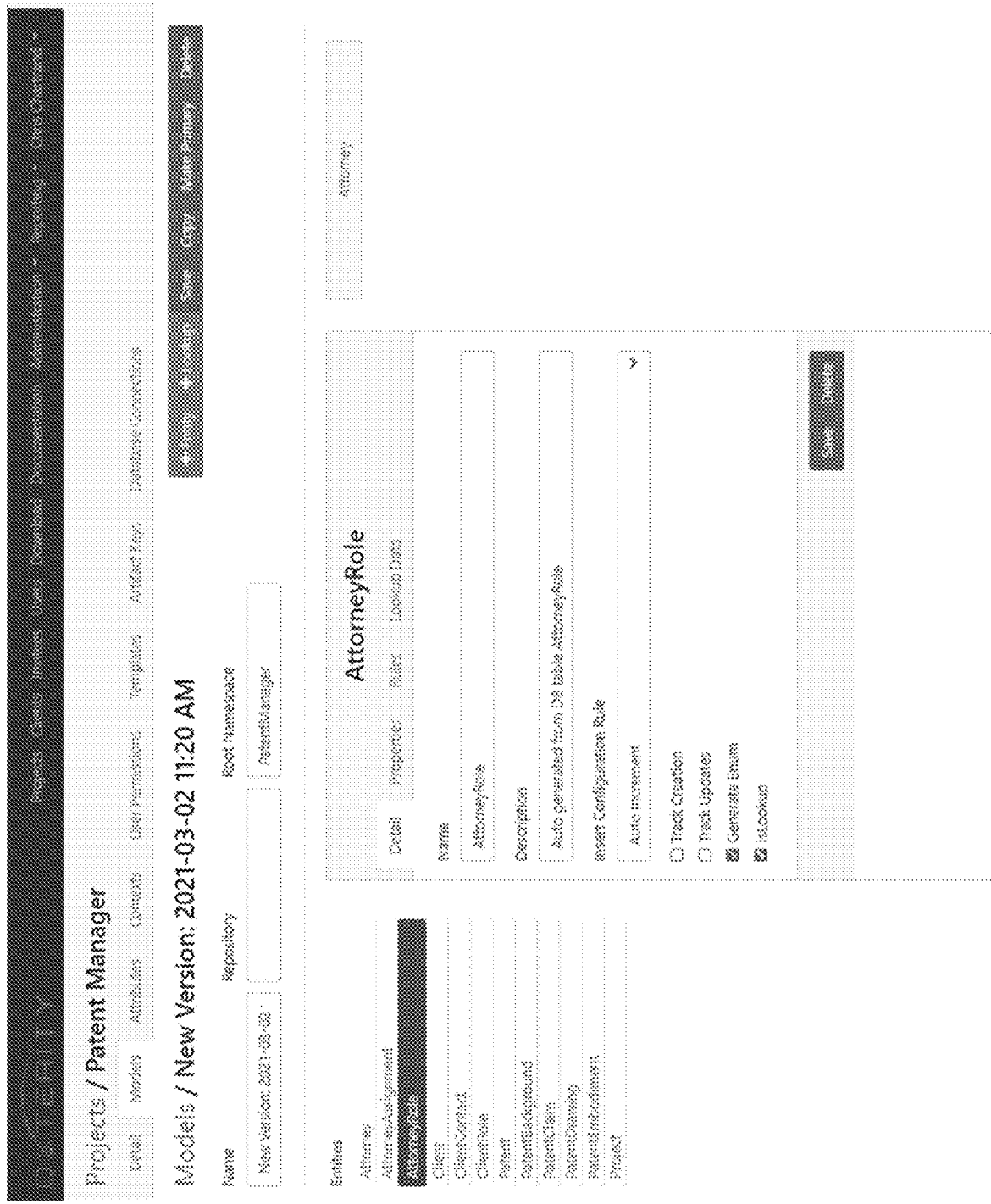
FIG. 8 is an example of setting details for a particular entity.

FIG. 8 is an example of an entity called "AttorneyRole" that was defined as being restricted to enumerated values. Here the entity may only take on one of two possible values, representing either a lead attorney or assistant attorney.

Figure 9:
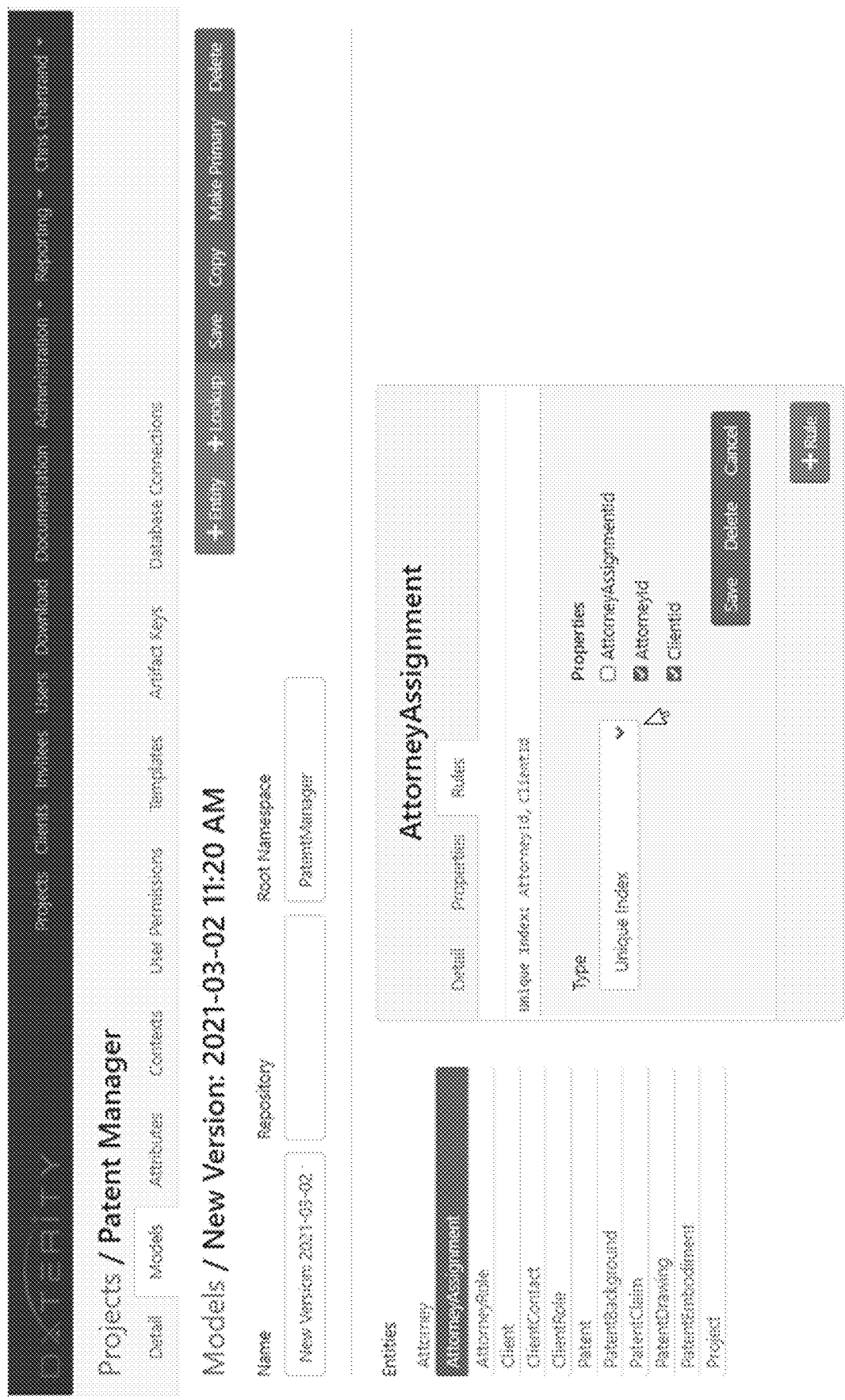
FIG. 9 is an example of how rules may be enforced in the abstract model.

FIG. 9 as an example of how the abstract model represents a rule applied to an entity. Here the AttorneyAssignment has an associated rule that requires it to always have an both a clientID and attorneyID relation.

Rules, properties and relations may be used to ensure that the resulting code conforms to desired characteristics of enterprise class code. For example, a uniqueness requirement may be imposed on a set of objects such as the first name, last name, and email address associated with an attorneyID. In another instance, an encryption requirement may be imposed on a certain field type regardless of where it appears in the model, such as a credit card number or social security number.

Figure 10:
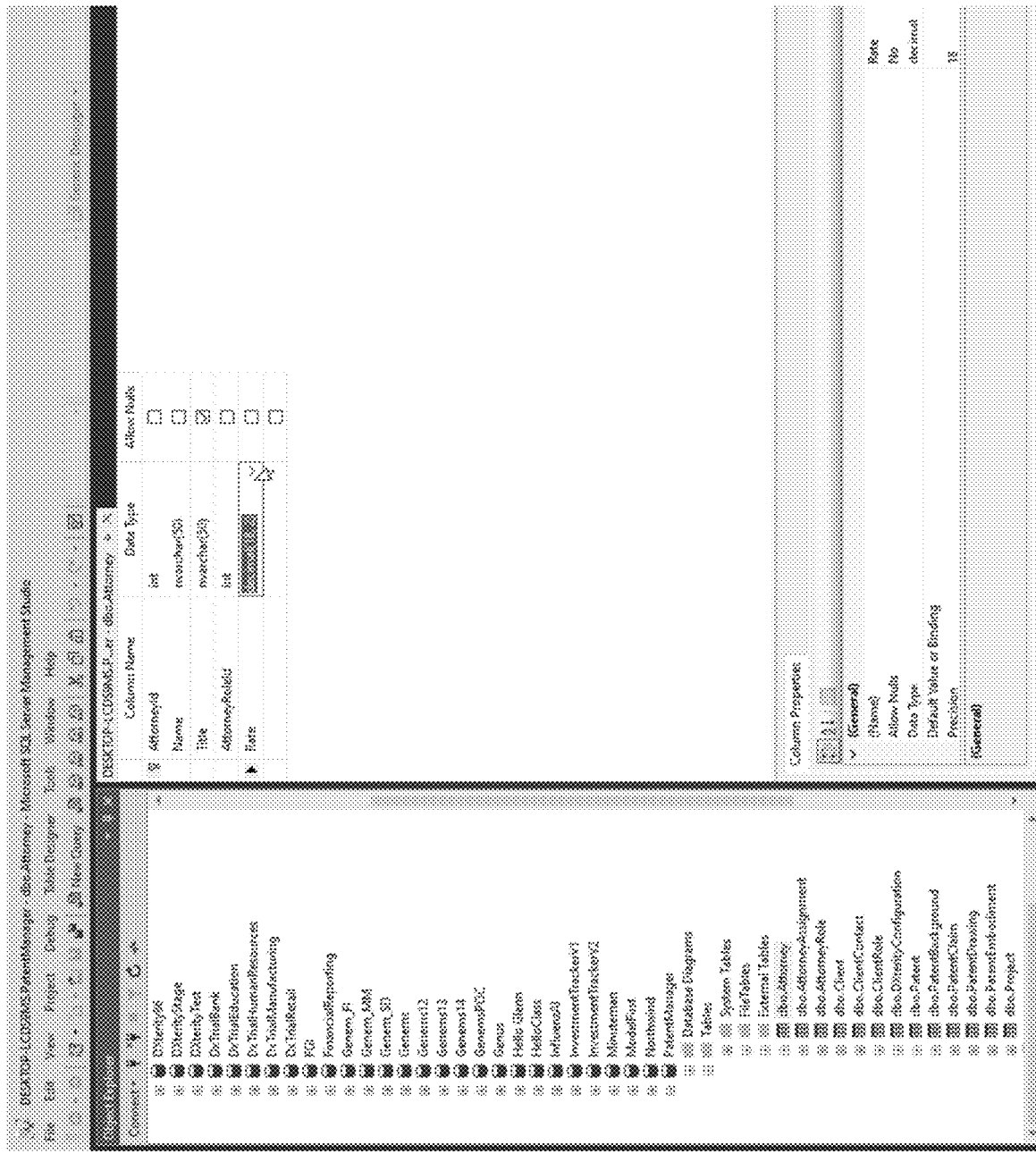
FIG. 10 shows how a developer may modify an entity data type in the abstract model.

FIG. 10 is another example of a user interface screen where database designer views has manually overridden a data type which the model originally assigned to an attorney billing rate.

Therefore, it should be noted that in these various figures just described, the database architect is using an interface to define further decorations for the abstract model, prior to any code generation for the database code, API or UI. These may include defining various properties and relations of the entities in the model, as well as defining attributes of the related user interface and application programming interfaces for the same.

V. Generated and Extended Code Examples

Figure 11:
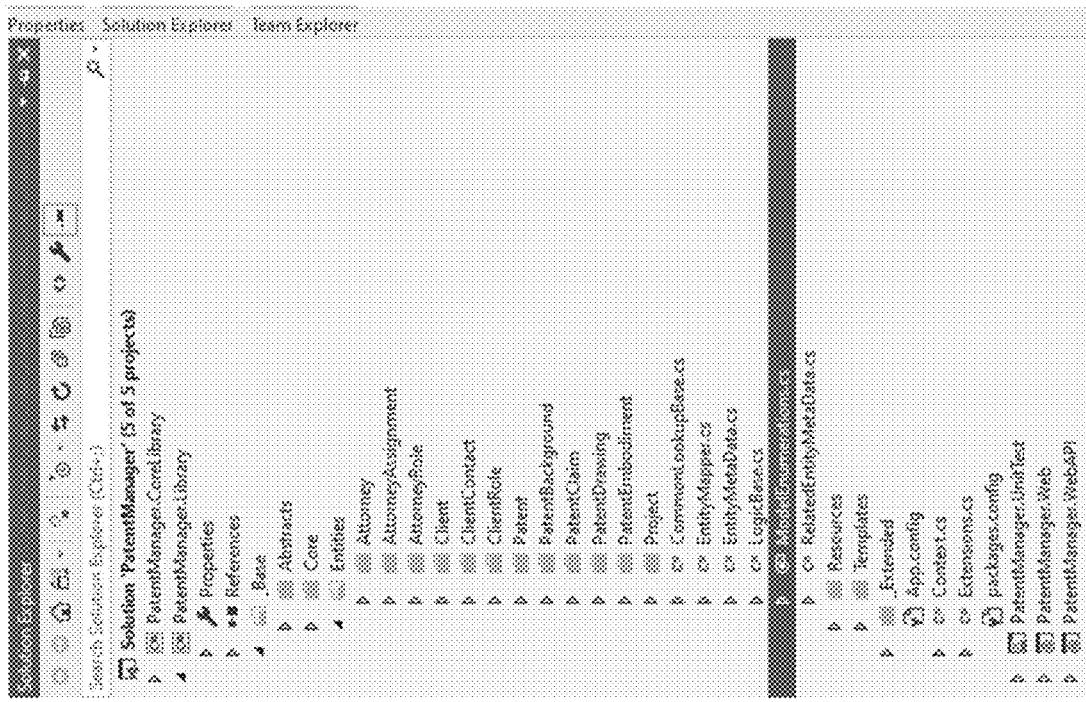
FIG. 11 is an example hierarchy of the generated code, API, and documentation.

FIG. 11 is an example screen which may be presented after Author 106 generates code. It may be seen that the base logic 422 code has been generated and stored in separate "folders" for each of the entities in the patent attorney model. At this stage there is also a folder for placement of any future extended logic. A core library, web UI and web API code has also been as code artifacts separate from the base logic layer.

Figure 12A:
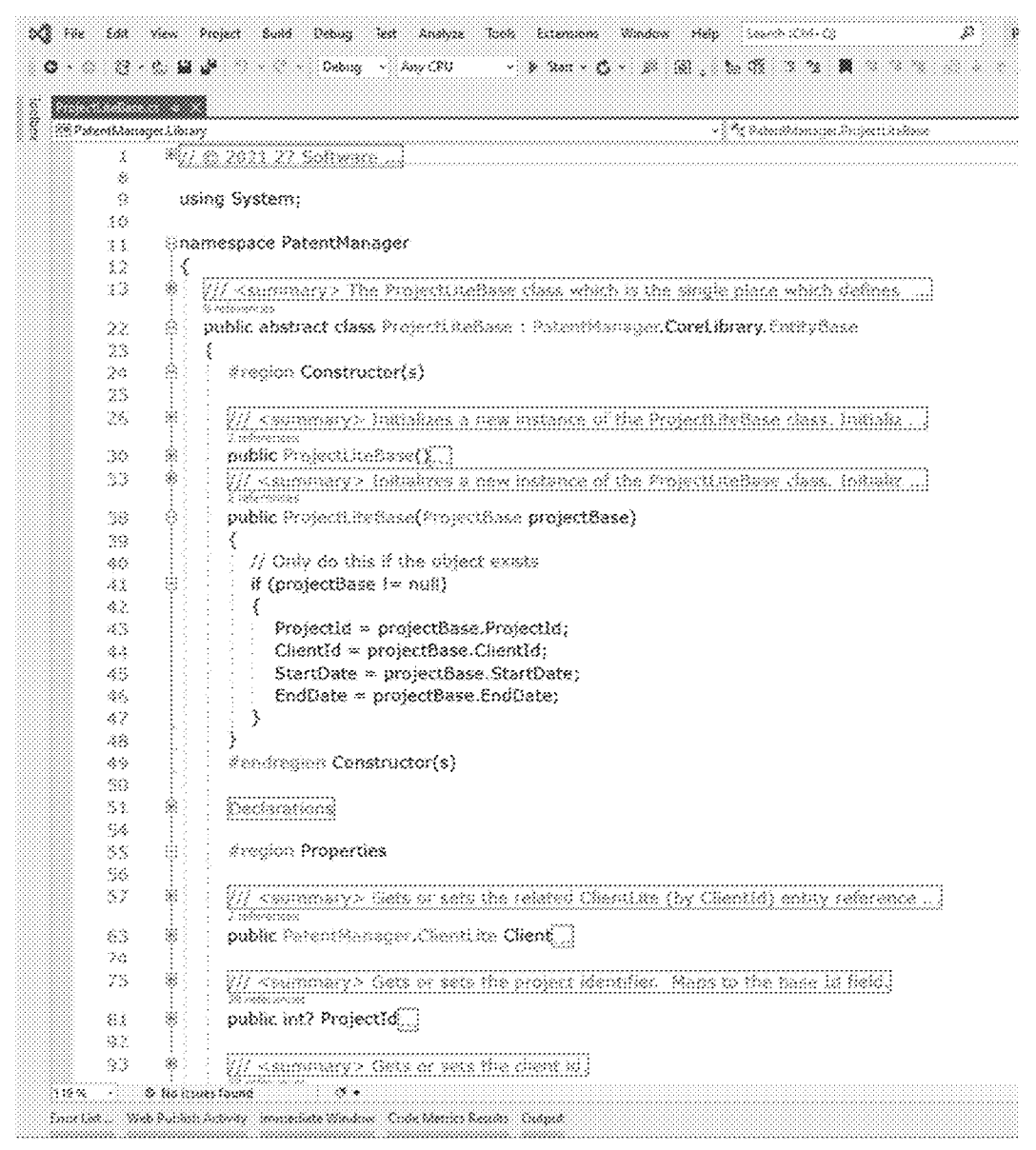
Figure 12B:
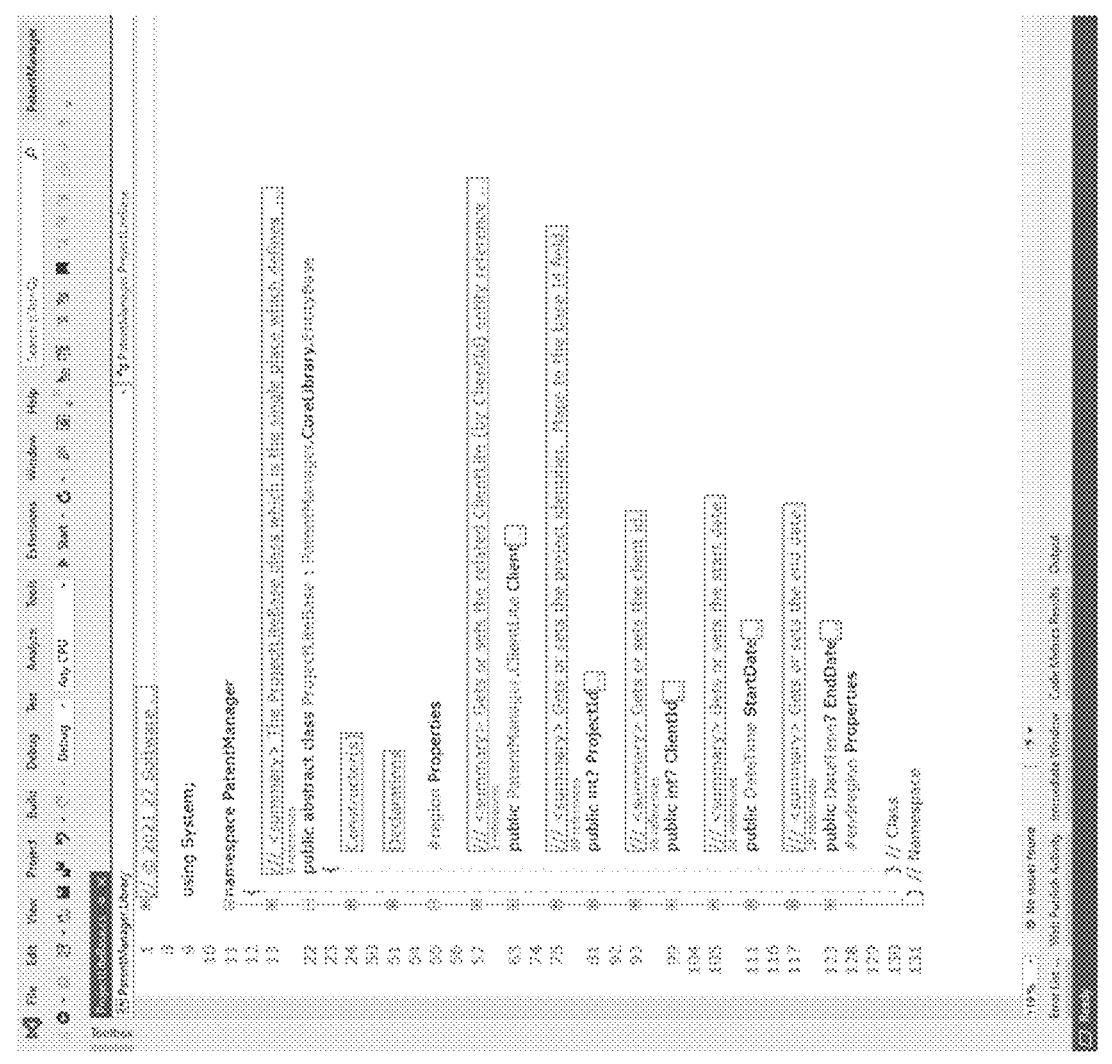
Figure 12C:
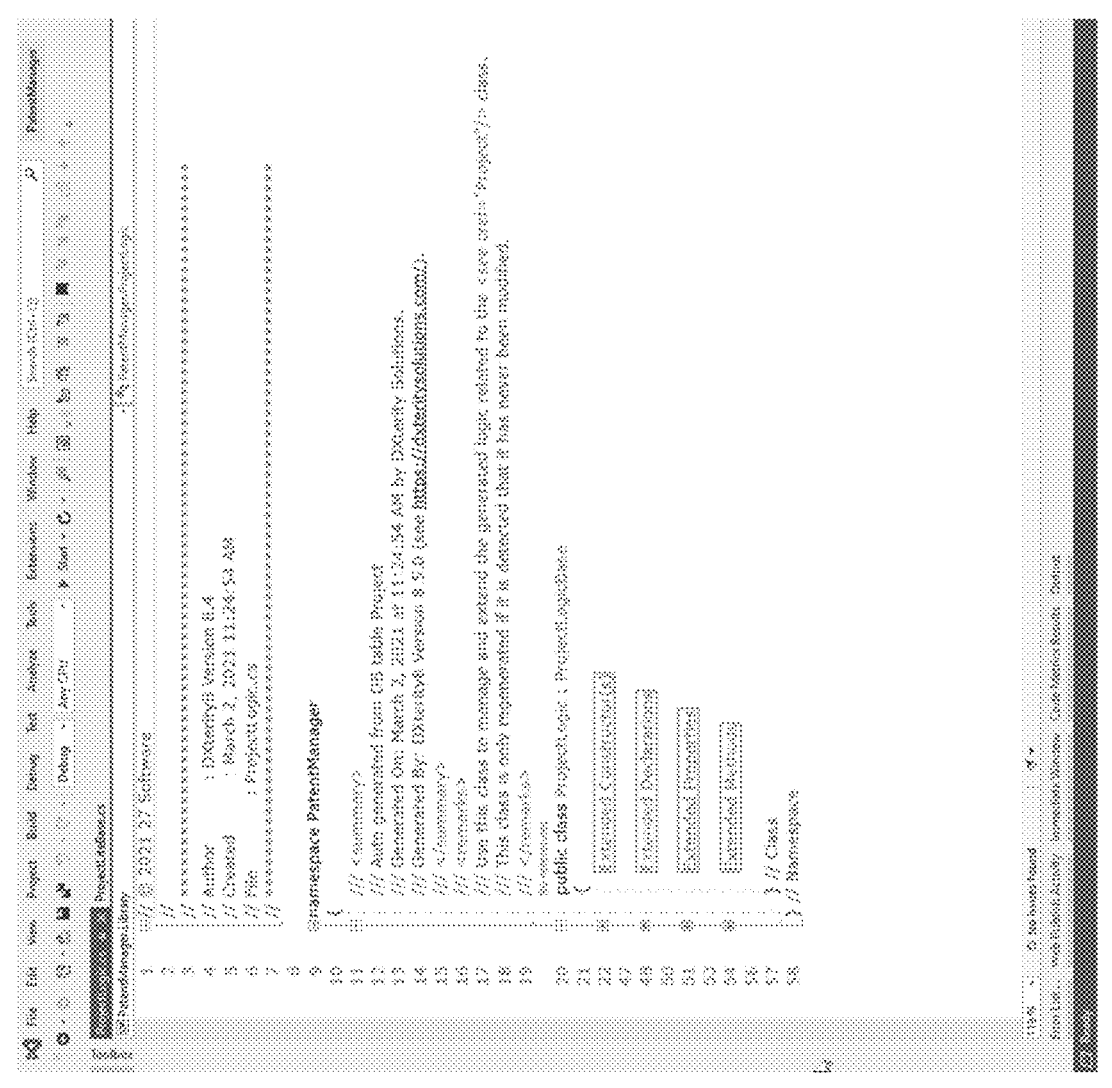

FIGS. 12A, 12B and 12C illustrate a more detailed example of generated code for a particular entity, the "Project" entity. FIG. 12A is part of the base code that serves as the constructor method for the Project entity. FIG. 12B is the code that defines its properties. FIG. 12C is an example of the code generated to serve as a location for any extended definitions of constructors, declarations, properties or methods related to the Project entity.

FIG. 13 is an example of database code generated for an entity limited to enumerated values. Here the "AttorneyRole" entity is seen to always be given either a value of one or a value of two, depending upon whether the attorney is a lead or support attorney. Also shown here is code for a "ClientRole" entity that enforces either a coordinator or a technical lead enumerated value.

As mentioned previously, this code is generated in a language specified by the developer (here SQL Server), although code may be generated in other database languages. Furthermore, the generated code including the base code remains exposed and visible to the developer to enable her to make changes typically as extended code. See the above description of the separation of generated and extended code.

Figure 14:
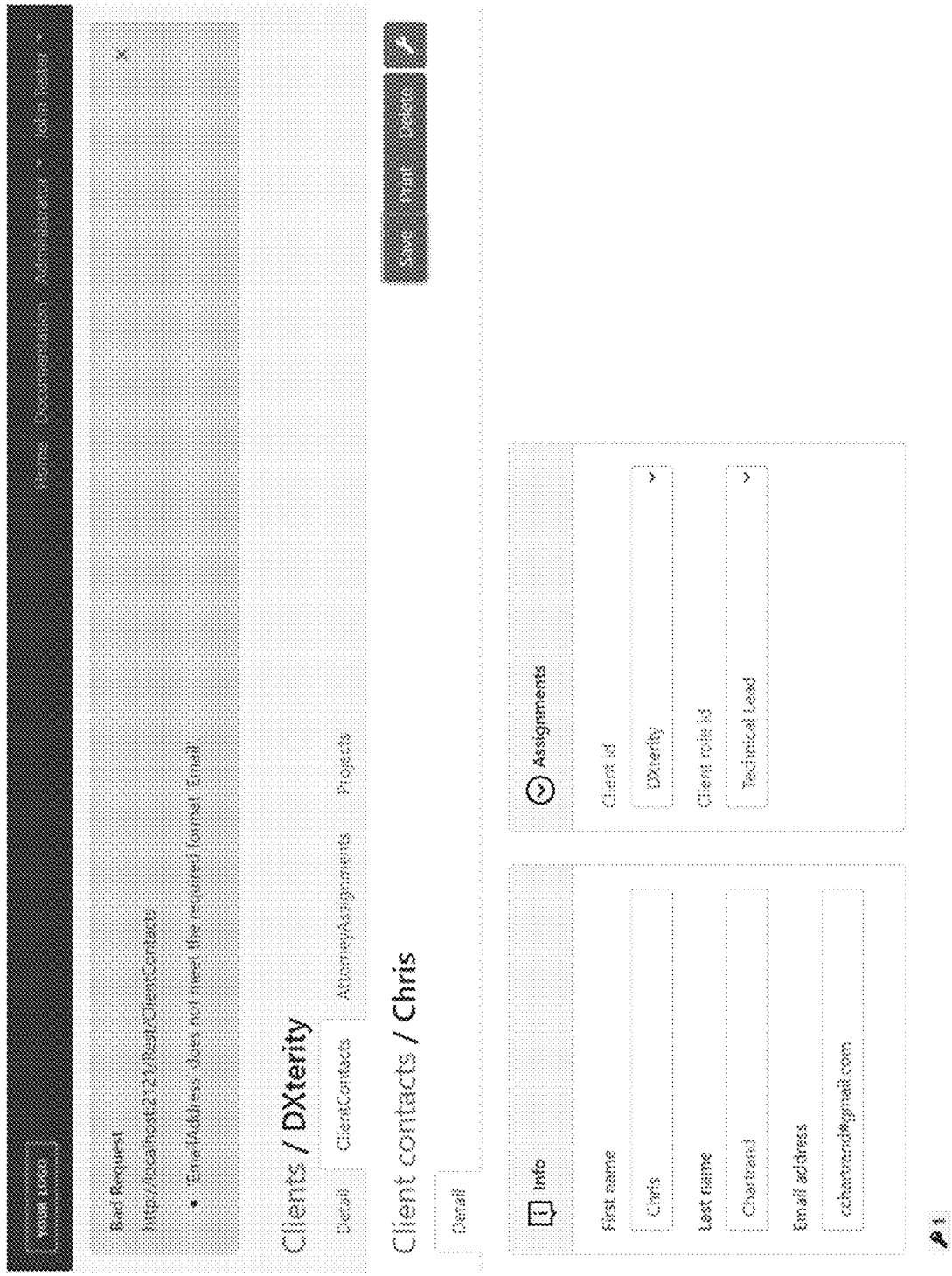
FIG. 14 shows a generated UI where the data entered for an email address entity does not comply with a required format.

FIG. 14 is an example of an automatically generated web interface as might be accessed by an end user who is running the resulting code. In this example, the end user is entering information for a new ClientContact. While they have entered a first and last name, the email address entered did not conform to the attributes defined for that entity (e.g., FIG. 7). The generated web UI automatically catches this error and displays a help message to the user.

Keep in mind that the code to generate this web UI was automatically generated from the abstract model and during the same generation activity the underlying base logic for the application was generated.

Figure 15:
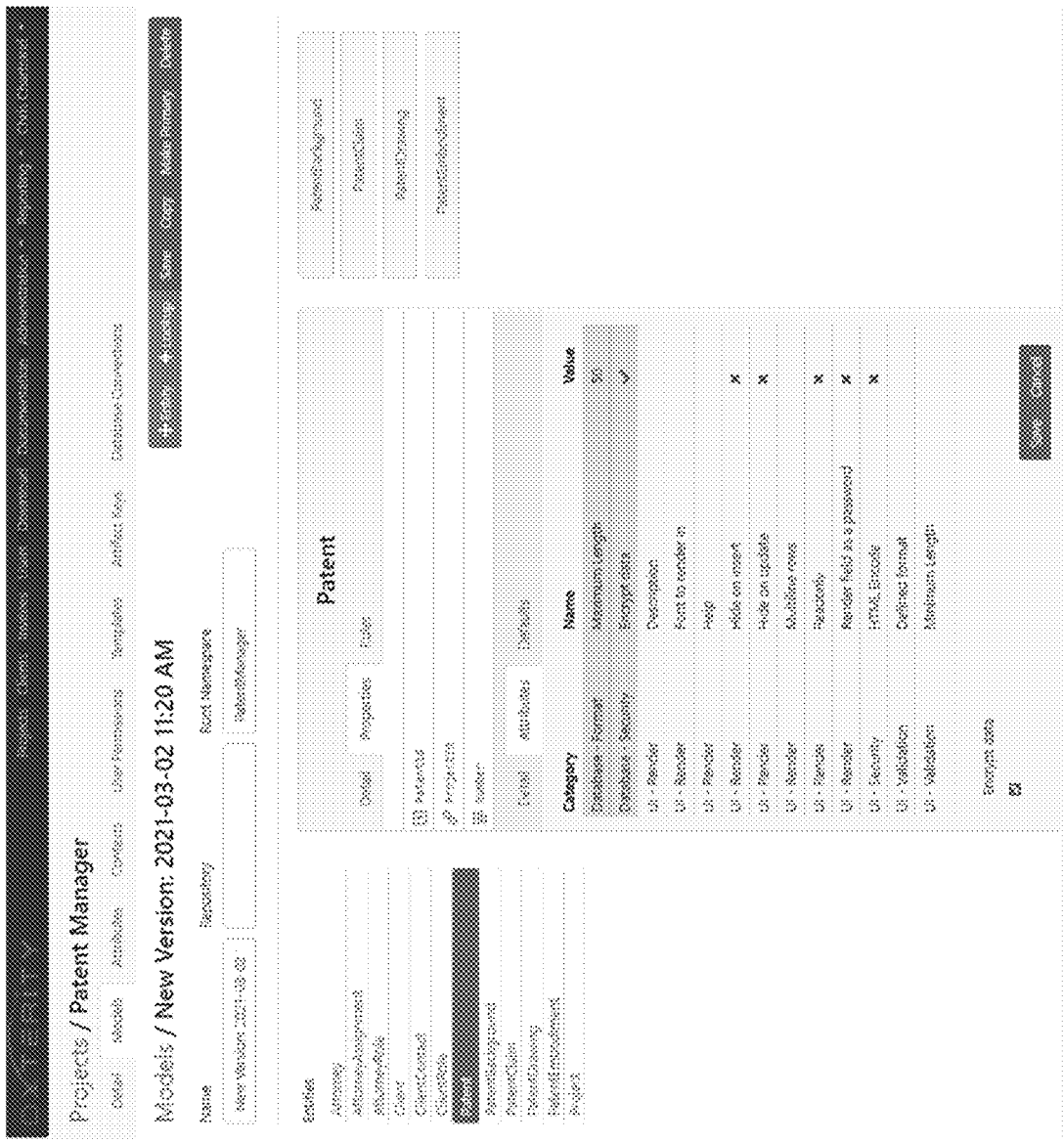
FIG. 15 is an example of using the platform, after generating code, to modify an attribute of an entity.

As explained above, the system is also capable of automatically adapting the generated base, UI and API code as the attributes and properties of entities are changed by the designer. In the example shown in FIG. 15, the architect has decided that the "Patent" entity should be revised to have a security attribute of "encrypted". All that is needed is for the architect to go into the DXterity platform 100, select the checkmarks associated with database security, and then run the Author to regenerate the code.

Figure 16:
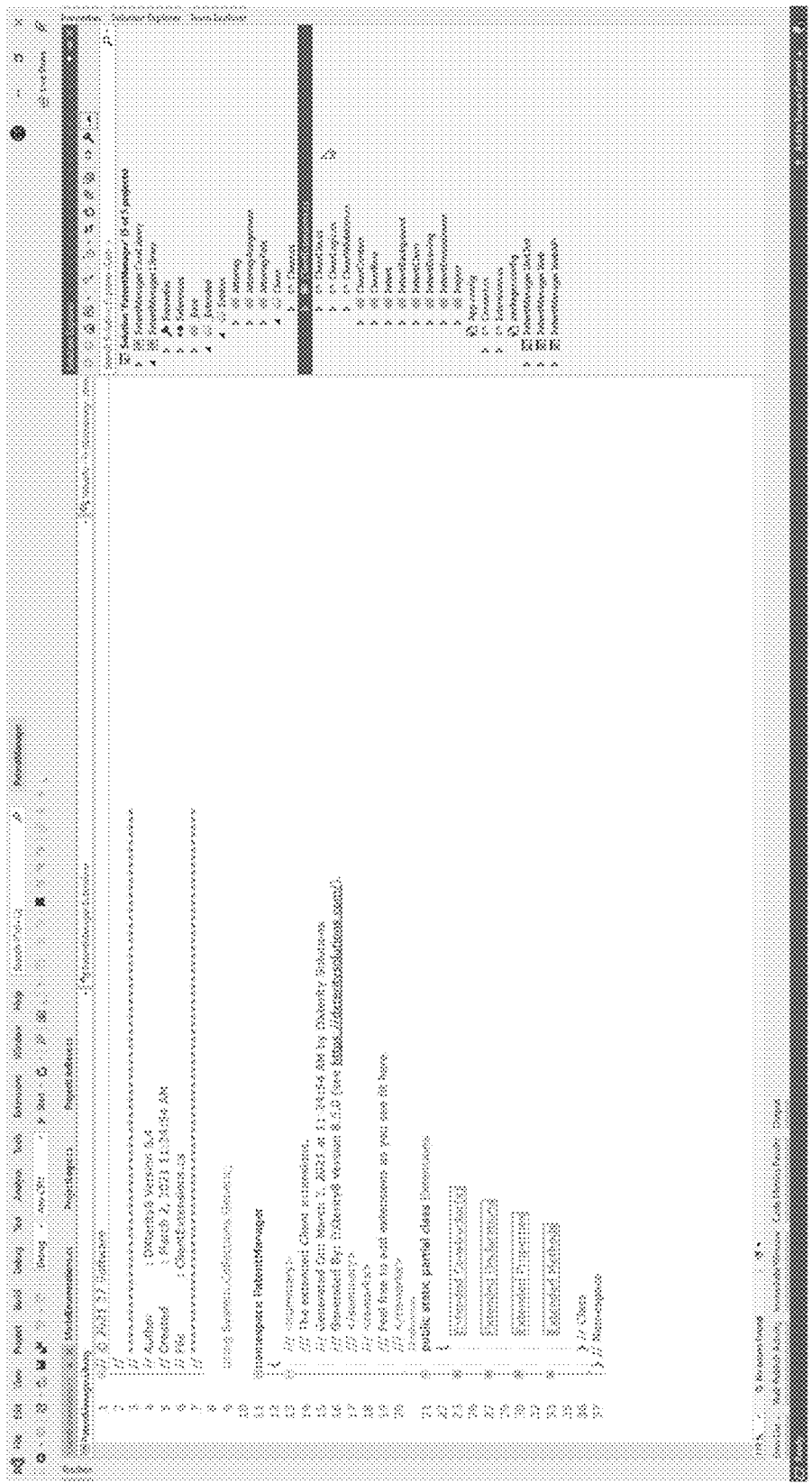
FIG. 16 illustrates how a property of an entity may be extended by a developer.

FIG. 16 shows the results of this. The resulting implementation of the encryption of the Attorney entity is not made to the base logic 422. Rather, that is stored as extended code logic 424.

Figure 17:
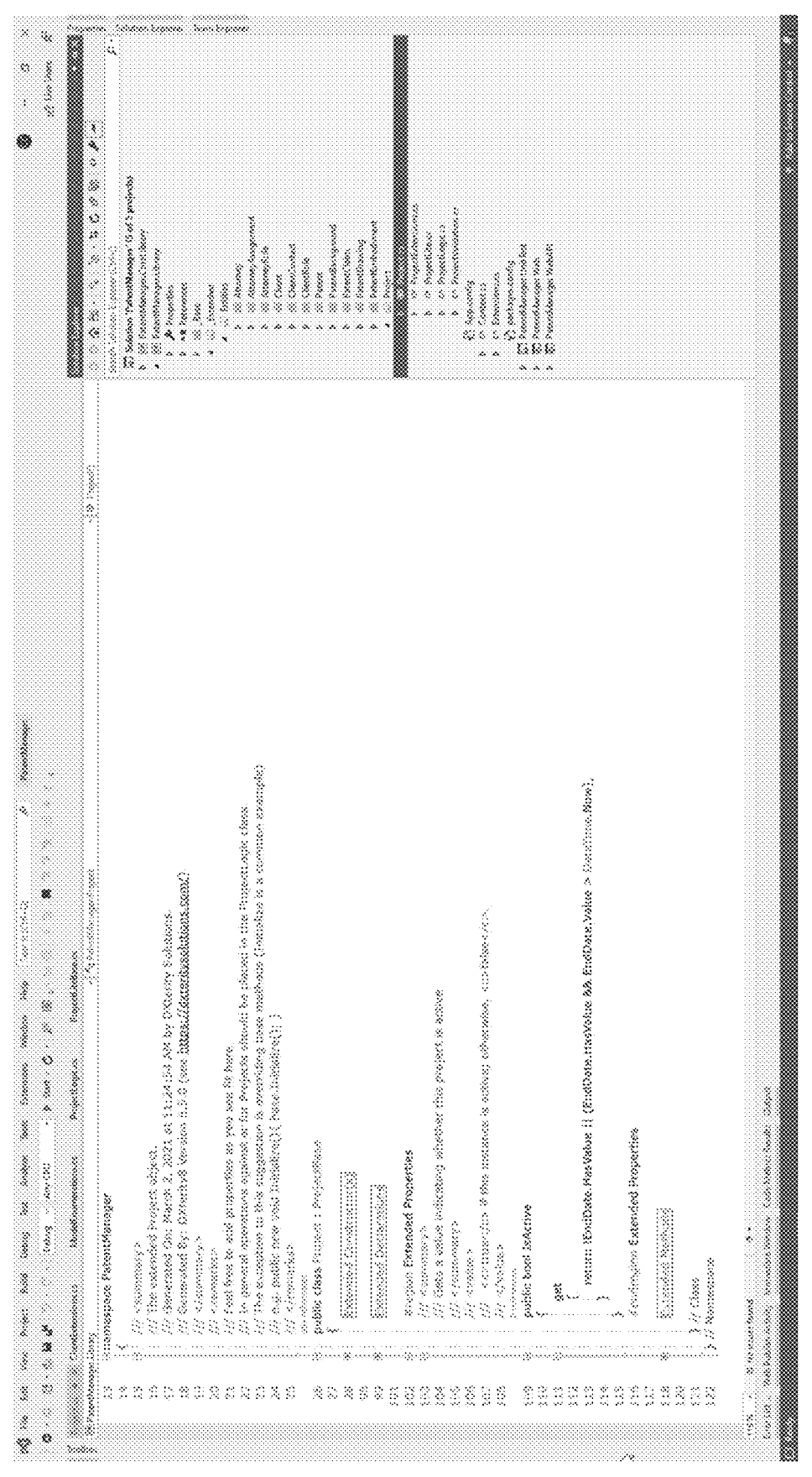

FIG. 17 is an example where a developer directly modifies generated base code 422. Again, the result is stored as an extension logic rather than as modification to the base logic. Here, while browsing the generated base logic, the database architect has decided that the Project entity should have an "Active" attribute that indicates whether an end date has been reached. The designer then defines an EndDate (in line 112) and provides a property that returns whether or not the EndDate value is greater than the current date. This modification to the code will now be stored as part of the project logic but as extended logic 424 that is separate from base logic 422. In this way, the system 100 always separates developer modified code from the base logic that is automatically generated from the model. As may be appreciated, this feature greatly assists with diagnosing problem areas or debugging the resulting code, since any developer modified sections which may deviate from the models may now be easily identified.

VI. Example APIs

Figure 18:
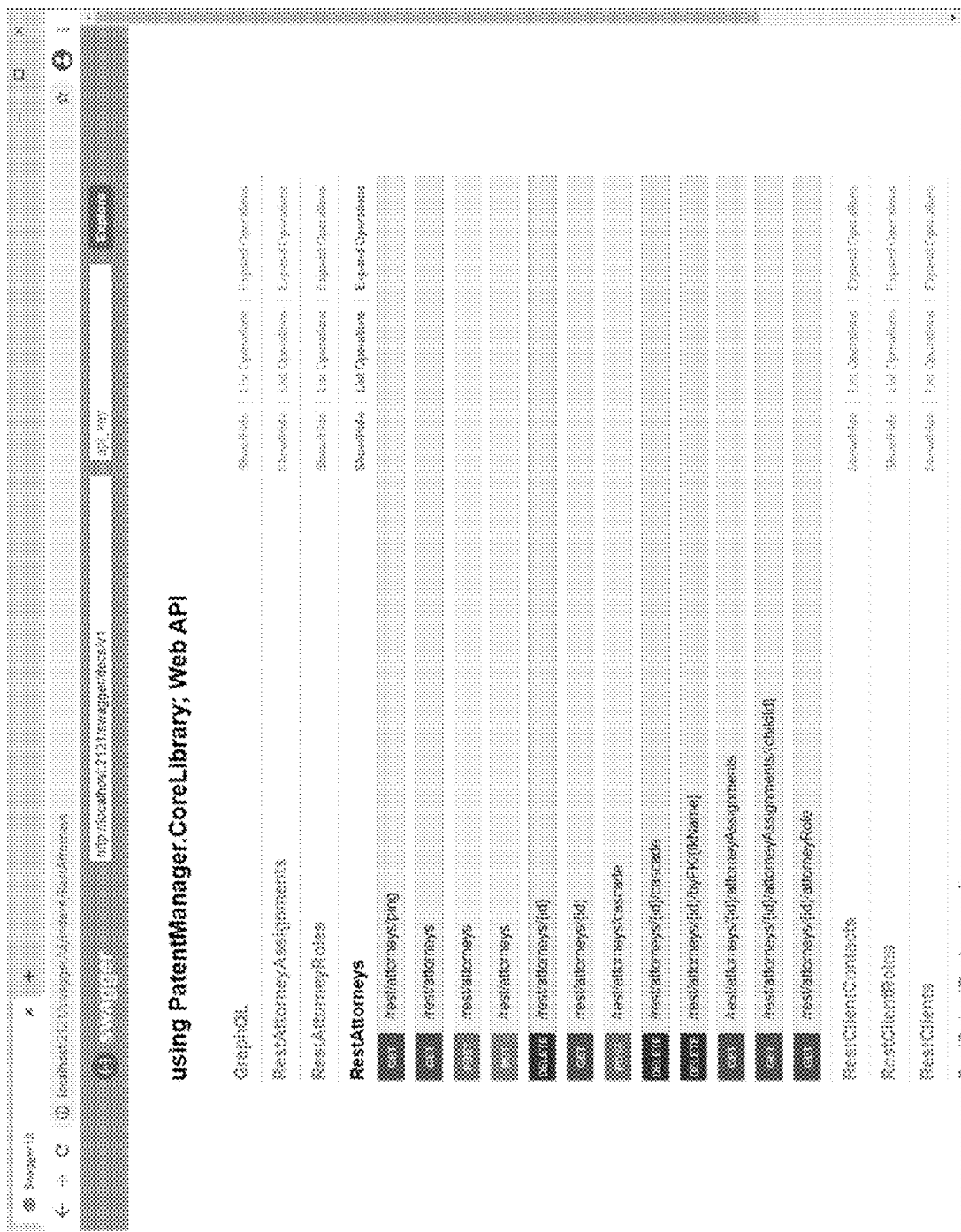
FIG. 18 is an example Rest API generated from the abstract model.

FIG. 18 is an example of a REST compliant API that may be generated from the model. The result was generated for a core library that implements the Attorney/Patent related application. Thus, the diagram included attorney roles, clients, patents and other entities as well. Here the architect may examine the attributes of the resulting API and test functions such as GET, POST, PUT, DELETE, and so forth.

Figure 19:
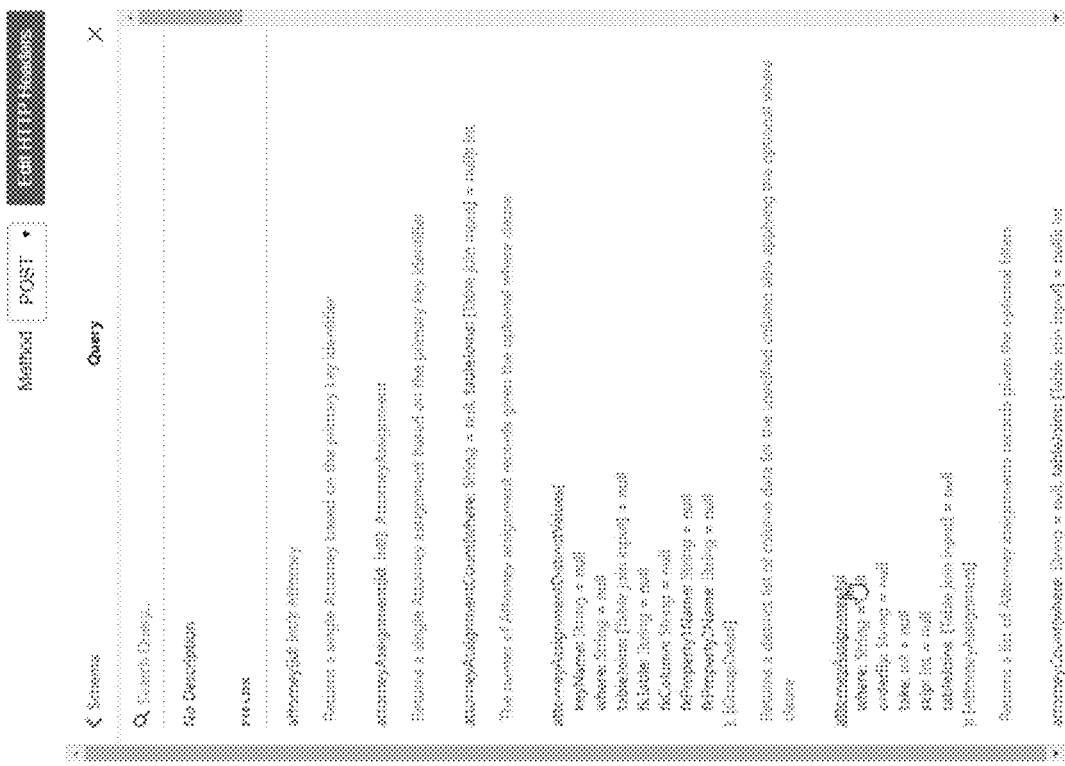
FIG. 19 is an example of a fully documented GraphQL API.
Figure 20:
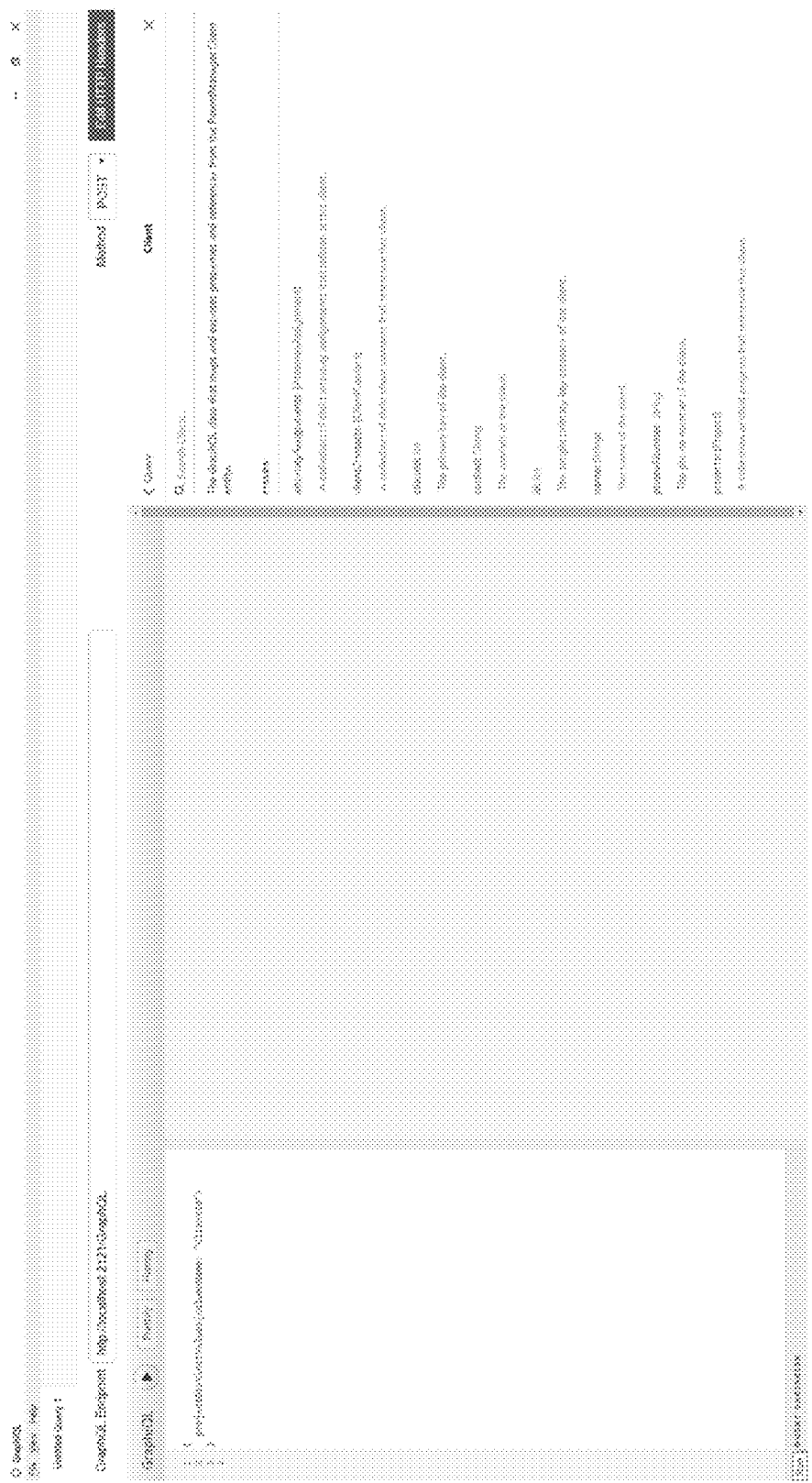
FIG. 20 is a more detailed view of the fully documented GraphQL API for a "clientID" entity.
Figure 21:
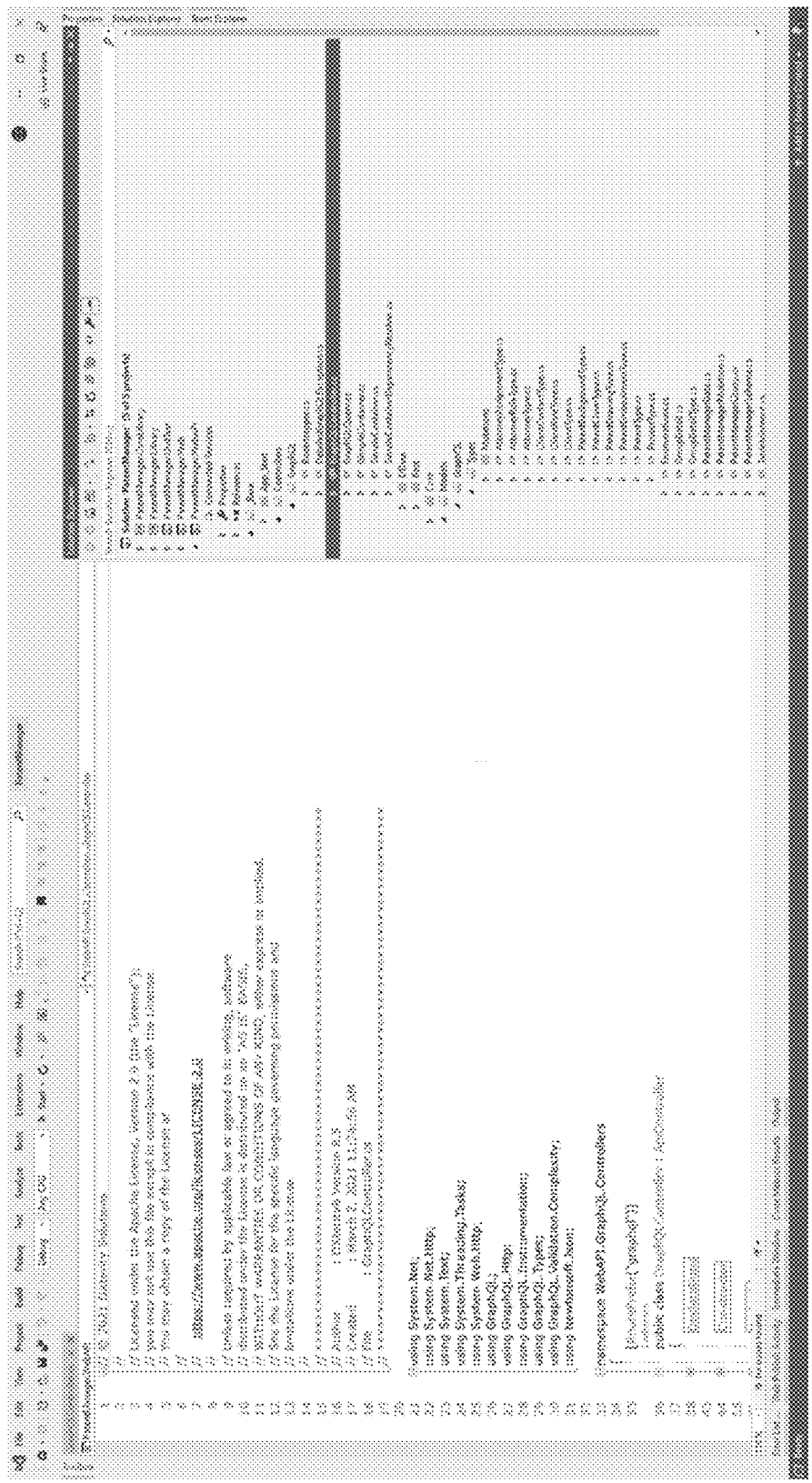
FIG. 21 illustrates how the code may be architected for a GraphQL API.

Another API example is FIG. 19 illustrating a GraphQL API and how it may be fully documented. A tool such as GraphiQL may be used to browse the generated API. In this example, the Attorney entity is seen to include a key name and other distinct values that define its properties or attributes. The related documentation in FIG. 20 was automatically generated at the same time the generated code was authored from the model. The documentation may be generated from abstract model and recognizing primary keys, properties, relations, descriptions, and other decorations of the model FIG. 21 is an example view of the generated code stack showing that GraphQL API code is stored as part of the base code.

Figure 22:
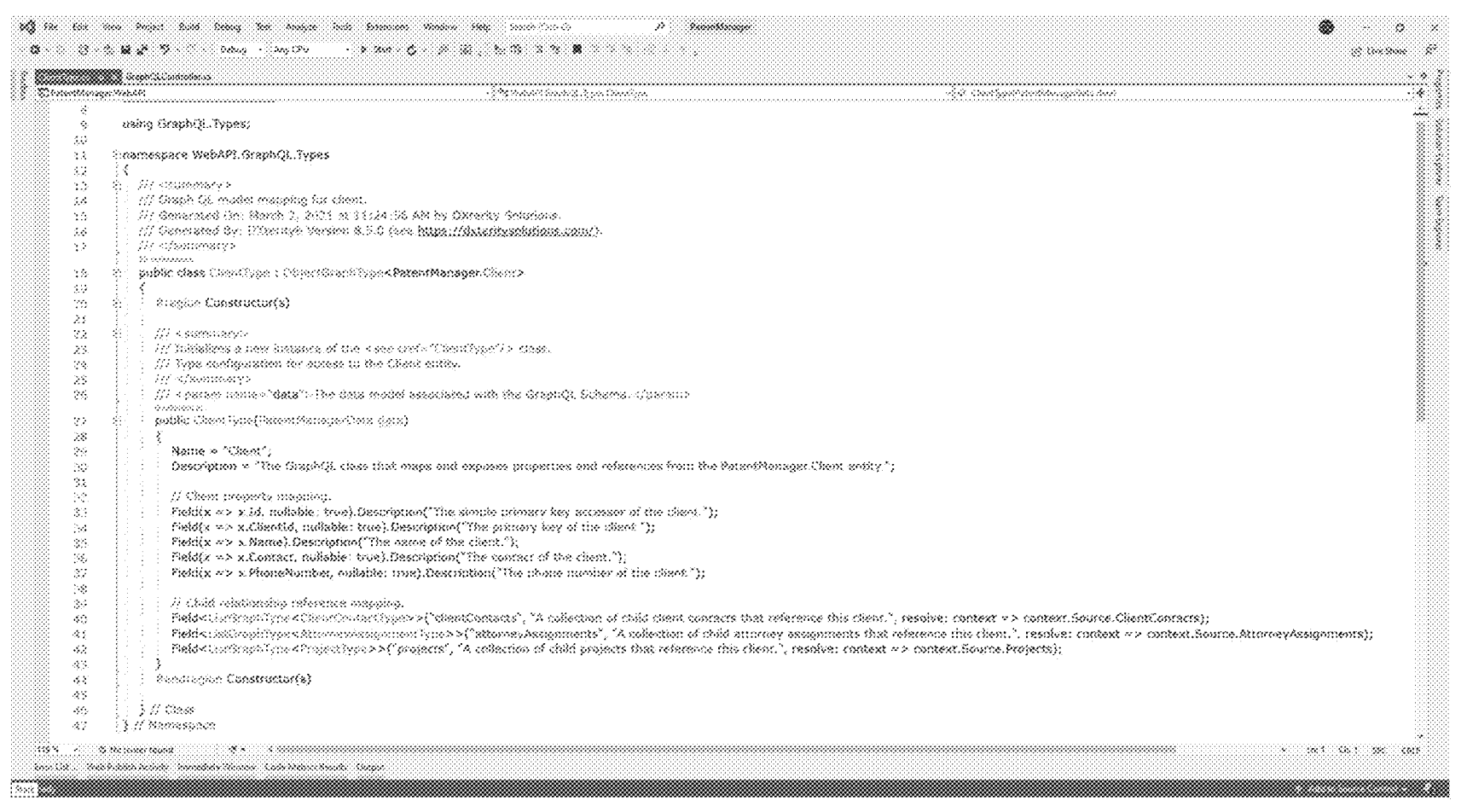

FIG. 22 is a more particular example of the generated code for the GraphQL API, illustrating for example the API properties mapped to the Client entity, including a Name, Contact, and Phone number properties and each of their related documentation descriptions. Note that the generated code is fully hydrated, such as that the fields, object classes and relations have been instantiated and thus populated and filled with domain data. In one example for the patent application, a fully hydrated "client" entity would include relations to all Contact types, attorney assignment and projects. subjects that he teaches, as well as all relations to all students currently taking classes in those subjects.

Figure 23:
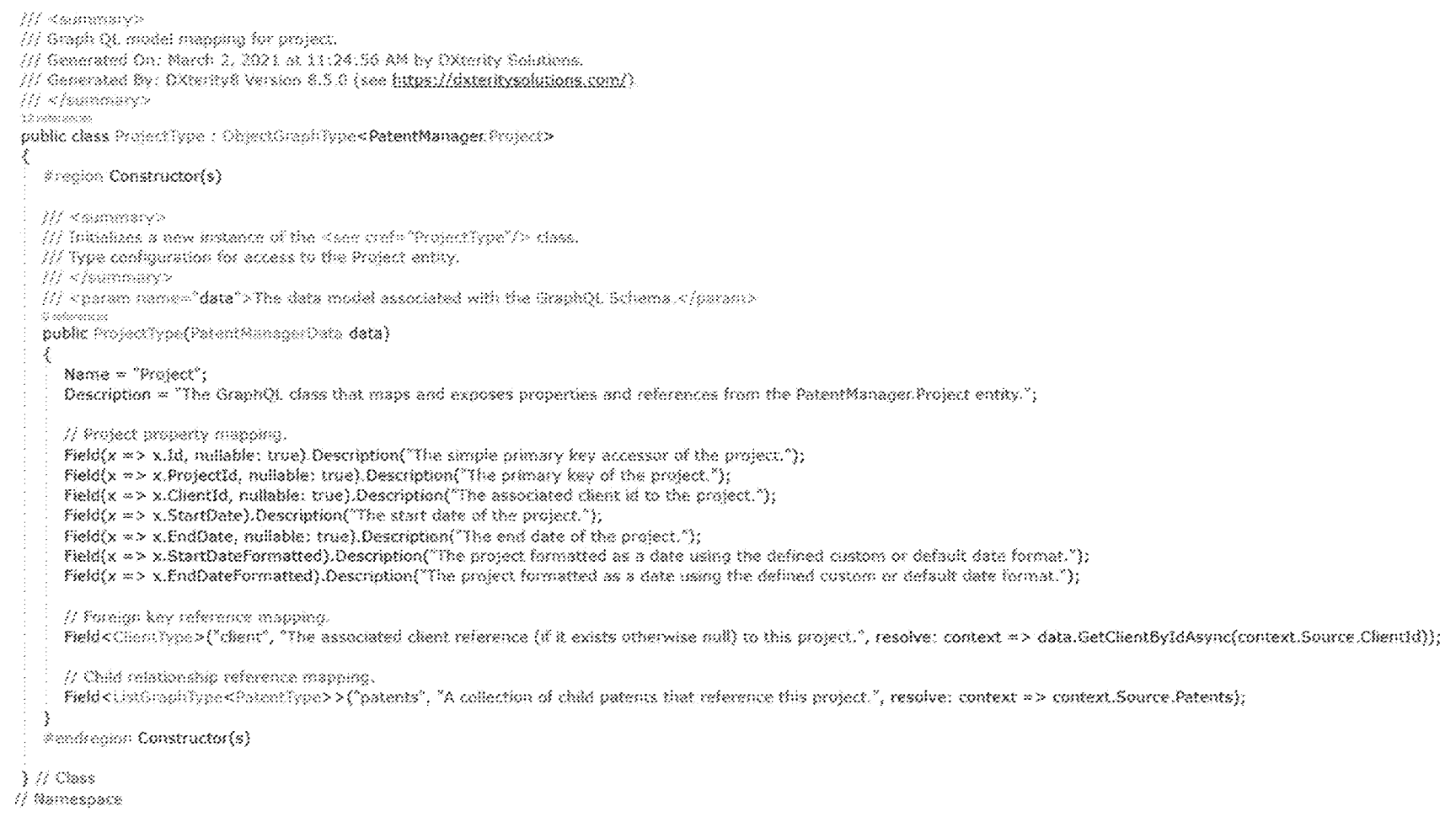

FIG. 23 is an example of a GraphQL API mapping the properties of the Project entity for the patent application.

Figure 24:
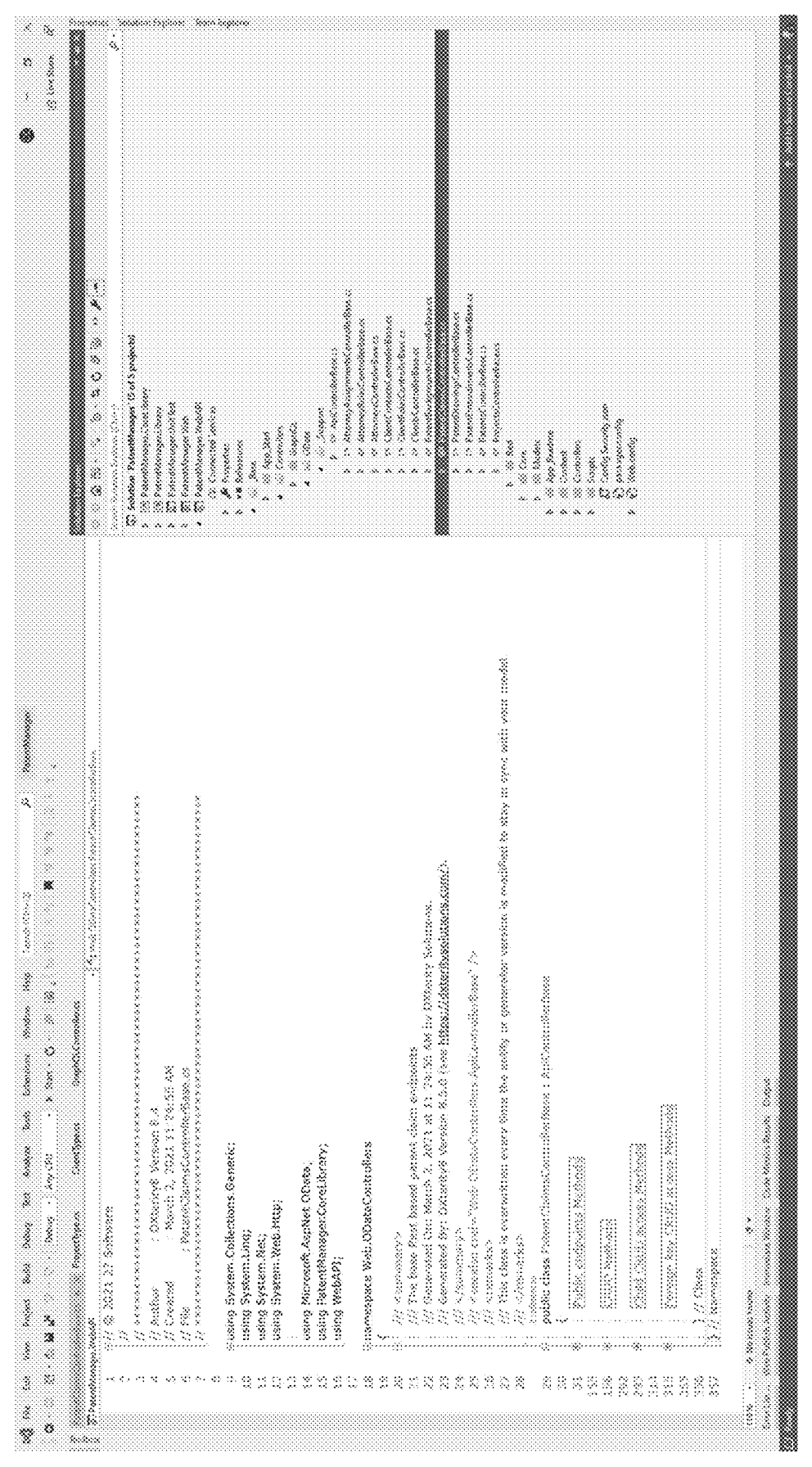

FIG. 24 is an example OData compliant API that may be generated for the "PatentClaim" entity in the other example application for a law firm.

Figure 25:
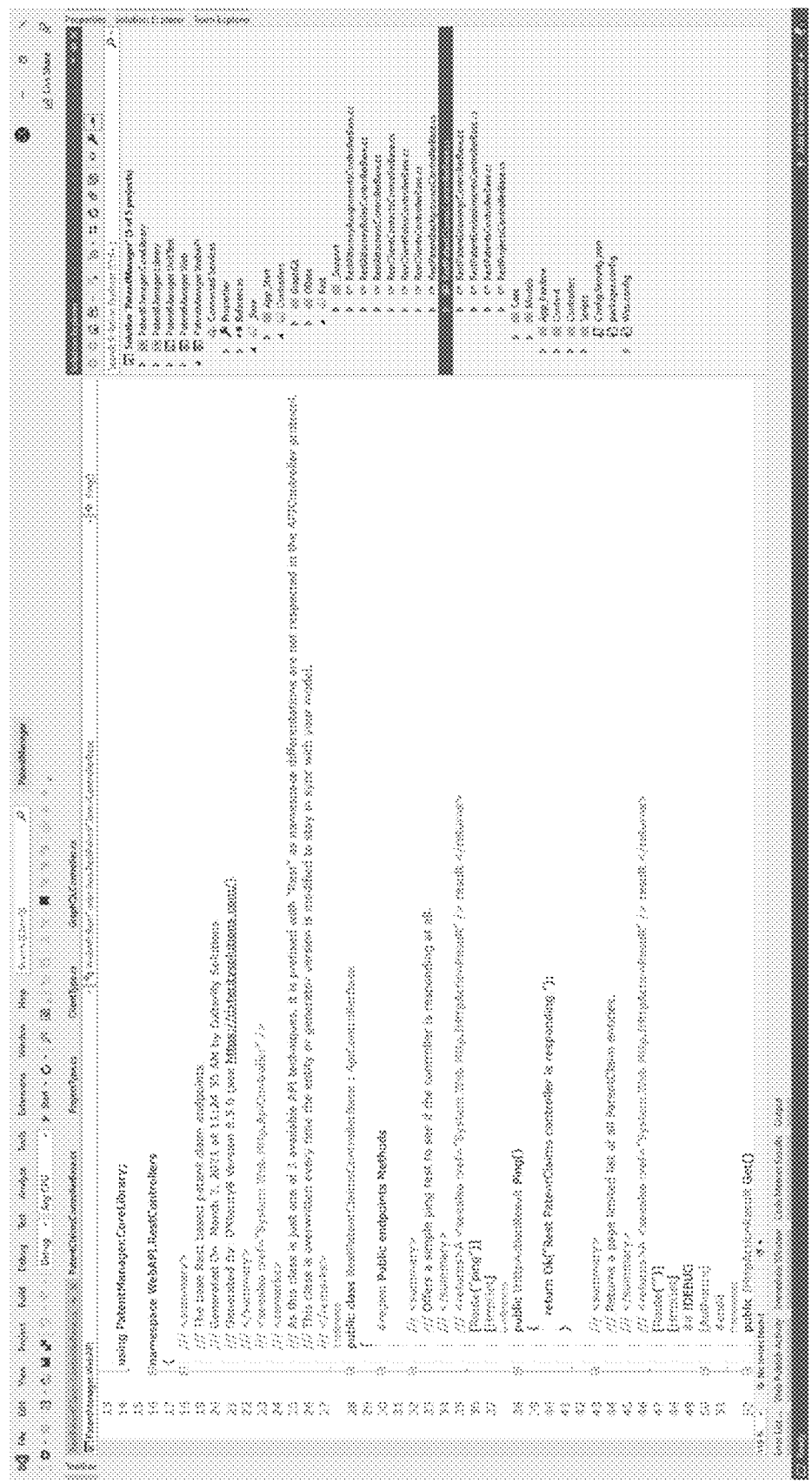
FIG. 25 is an example of full hydration.

FIG. 25 is an example of a fully hydrated "PatentClaim" entity.

Figure 26:
FIG. 26 lists some of the advantages of the approach described herein.

FIG. 26 is a graphic listing some of the resulting advantages of the code generation approaches described herein. These include speed, agility, and stability in the code generation process. The architect is able to start earlier with minimal cost and receives feedback more quickly. The solution may implement testing at the first juncture. Requests to modify the generated code may be quickly responded to, with minimal loss of results and maximized stability even with such changes. The process also reduces long-term support costs and simplifies debugging efforts, while guaranteeing well documented code. Operating budgets may be repurposed while simultaneously delivering maximum effectiveness over the life cycle of the software solution.

Figure 27:
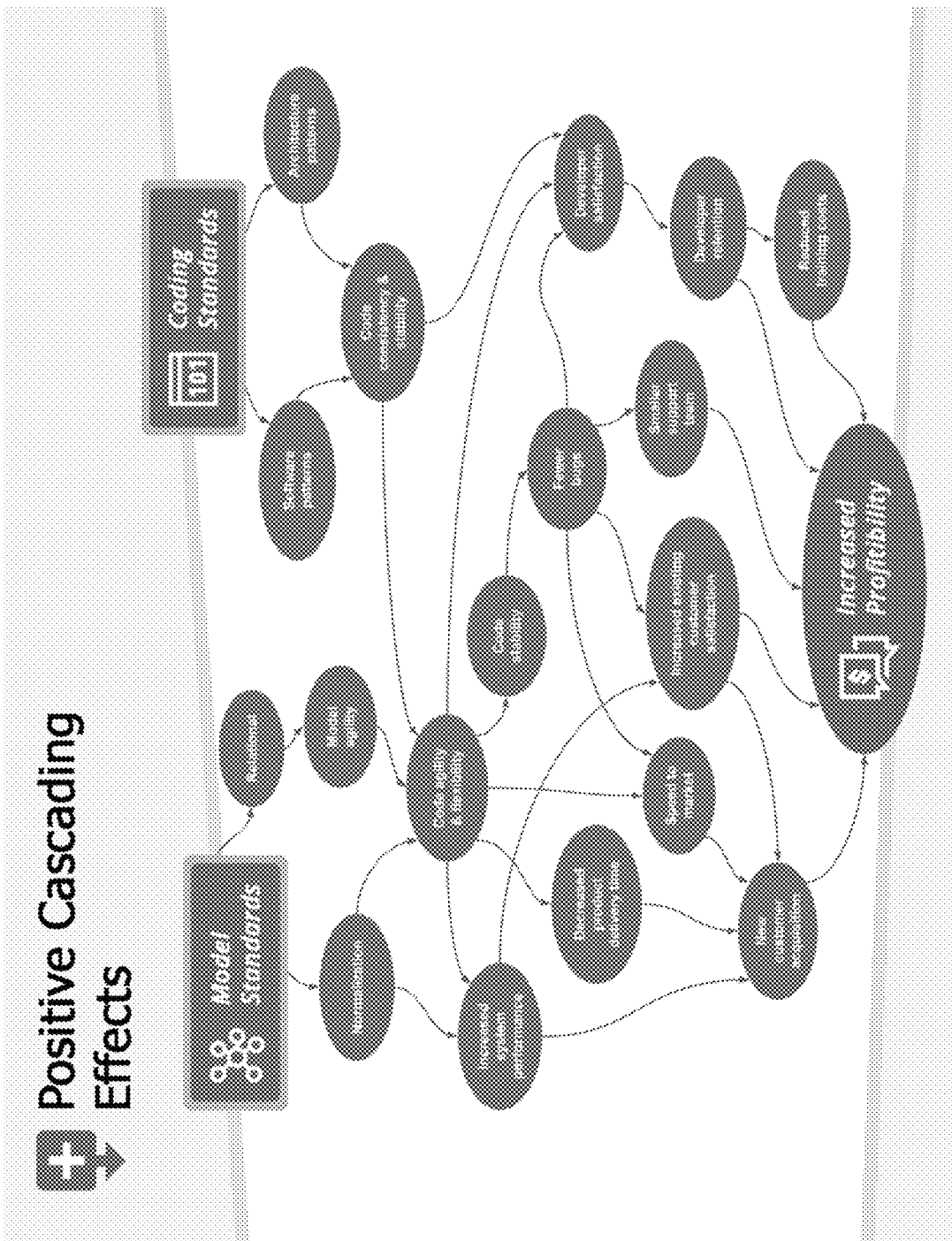
FIG. 27 illustrates other advantages.

FIG. 27 is another list of some of the cascading effects of this approach. These include adherence to modeling standards that are desirable for enterprise class database application. Other standards such as coding standards, including application software patterns, architecture patterns, code consistency and stability may be enforced. Other cascading effects include increased system performance, agility, flexibility, and stability. A smaller team may support the application, with increased speed to market and improved customer and developer satisfaction.

VII. Further Implementation Options

It should be understood that the example embodiments described above are not intended to be exhaustive or limited to the precise form disclosed, and thus may be implemented in many different ways. In some instances, the various "data processors" may each be implemented by a separate or shared physical or virtual or cloud-implemented general-purpose computer having or having access to a central processor, memory, disk or other mass storage, communication interface(s), input/output (I/O) device(s), and other peripherals. The general-purpose computer is transformed into the processors and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments of the components may therefore typically be implemented in hardware, firmware, software or any combination thereof. In some implementations, the computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that may be rapidly provisioned and released with minimal management effort or service provider interaction. Such cloud computing deployments are relevant and typically preferred as they allow multiple users to access computing. By aggregating demand from multiple users in central locations, cloud computing environments may be built in data centers that use the best and newest technology, located in the sustainable and/or centralized locations and designed to achieve the greatest per-unit efficiency possible.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block, flow, network and code diagrams and listings may include more or fewer elements, be arranged differently, or be represented differently.

Other modifications and variations are possible in light of the above teachings. For example, while a series of steps has been described above with respect to the flow diagrams, the order of the steps may be modified in other implementations. In addition, the steps, operations, and steps may be performed by additional or other modules or entities, which may be combined or separated to form other modules or entities. For example, while a series of steps has been described with regard to certain figures, the order of the steps may be modified in other implementations consistent with the principles of the invention. Further, non-dependent steps may be performed in parallel. Further, disclosed implementations may not be limited to any specific combination of hardware.

Certain portions may be implemented as "logic" that performs one or more functions. This logic may include hardware, such as hardwired logic, an application-specific integrated circuit, a field programmable gate array, a microprocessor, software, wetware, or a combination of hardware and software. Some or all of the logic may be stored in one or more tangible non-transitory computer-readable storage media and may include computer-executable instructions that may be executed by a computer or data processing system. The computer-executable instructions may include instructions that implement one or more embodiments described herein. The tangible non-transitory computer-readable storage media may be volatile or non-volatile and may include, for example, flash memories, dynamic memories, removable disks, and non-removable disks.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

Also, the term "user", as used herein, is intended to be broadly interpreted to include, for example, a computer or data processing system or a human user of a computer or data processing system, unless otherwise stated.

Also, the term "developer" as used herein, is intended to refer to a particular type of user who is enabled to create software applications or systems that run on a computer or another device; analyze other users' needs and/or then design, develop, test, and/or maintain software to meet those needs; recommend upgrades for existing programs and systems; and/or design pieces of an application or system and plan how the pieces will work together.

The above description has particularly shown and described example embodiments. However, it will be understood by those skilled in the art that various changes in form and details may be made therein without departing from the legal scope of this patent as encompassed by the appended claims.

The invention claimed is:

1. A method for generating code from a model of a database, comprising:
generating base application code from the model;
generating an extended application code structure for subsequent placement of extended application code, wherein components of the extended application code include one or more code extensions to the base application code, and one or more attributes, properties or rules that are specified other than by generating from the model;
storing the extended application code structure separately from the base application code;
exposing the base application code and extended application code structure for developer review, with a warning that the base application code may be regenerated;
accepting developer modifications to the base application code;
accepting developer modifications to the components of the extended application code structure;
accepting developer modifications to the model to provide a revised model; and
regenerating code by:
overwriting any developer modifications to the base application code by regenerating the base application code from the revised model; and
otherwise preventing any overwriting of the components of the extended application code structure after such developer modifications are made to the components of the extended application code.

2. The method of claim 1 additionally comprising:
generating base Application Programming Interface (API) code from the model;
generating an extended API code structure for subsequent placement of extended API code;
storing the extended API code structure separately from any base API code;
exposing the base API code and extended API code structure for developer review, with a warning that the base API code may be regenerated;
accepting developer modifications to the base API code;
accepting developer modifications to the extended API code structure, including extended API code;
regenerating the base API code from the revised model by:
overwriting any developer modifications to the base API code; and
otherwise preventing any overwriting of the API extended code after such developer modifications are made to the extended API code.

3. The method of claim 1 wherein the base application code implements an enterprise class application.

4. The method of claim 1 comprising:
generating base user interface (UI) code from the model;
generating an extended UI code structure for subsequent placement of extended UI code;
storing the extended UI code structure separately from any base UI code;
exposing the base UI code and extended UI code structure for developer review, with a warning that the base UI code may be regenerated;
accepting developer modifications to the base UI code;
accepting developer modifications to the extended UI code structure, including extended UI code;
regenerating the base UI code from the revised model by:
overwriting any developer modifications to the base UI code; and
otherwise preventing any overwriting of the UI extended code after such developer modifications are made to the extended UI code.

5. The method of claim 4 wherein at least some portion of the extended UI code is stored as a configuration file.

6. The method of claim 4 additionally comprising:
automatically generating documentation related to at least the extended UI code from the model.

7. The method of claim 1 additionally comprising:
generating core code as common code shared across at least two other code tiers.

8. The method of claim 2 additionally comprising:
generating base API code from the model that comprises two or more different API methods.

9. The method of claim 8 wherein the different API methods are selected from GraphQL, REST or OData.

10. The method of claim 2 additionally comprising:
automatically generating documentation for the base API code from the model.

11. A method for generating code from a model of a database, comprising:
generating base application code from the model;
generating an extended application code structure for subsequent placement of extended application code, wherein components of the extended application code include one or more code extensions to the base application code, and one or more attributes, properties or rules that are specified other than by generating from the model;
storing the extended application code structure separately from the base application code;
exposing the base application code and extended application code structure for developer review, with a warning that the base application code may be regenerated;
accepting developer modifications to the base application code;
accepting developer modifications to the extended application code structure;
accepting developer modifications to the model to provide a revised model; and
regenerating code by:
overwriting any developer modifications to the base application code by regenerating the base application code from the revised model; and
otherwise preventing any overwriting of the components of the extended application code structure after such developer modifications are made to the extended application code;
and further comprising:
generating base user interface (UI) code from the model;
generating an extended UI code structure for subsequent placement of extended UI code;
storing the extended UI code structure separately from any base UI code;
exposing the base UI code and extended UI code structure for developer review, with a warning that the base UI code may be regenerated;
accepting developer modifications to the base UI code;
accepting developer modifications to the extended UI code structure, including extended UI code;
regenerating the base UI code from the revised model by:
overwriting any developer modifications to the base UI code; and
otherwise preventing any overwriting of the UI extended code after such developer modifications are made to the extended UI code;
wherein at least some portion of the extended UI code is stored as a configuration file;
and further comprising:
generating a compiled representation from one or more of (a) the base application code, (b) extended application code, or (c) base UI code; and
late binding of the extended UI code stored in the configuration file, by interpreting the configuration file when the compiled representation is executed.

12. A system for generating code from a model of a data store, comprising:
a computing platform having one or more processors and one or more computer readable memory devices;
program instructions embodied by the one or more computer readable memory devices, the program instructions causing one or more of the processors, when executed, to generate the code by further:
generating base application code from the model;
generating an extended application code structure for subsequent placement of extended application code, wherein components of the extended application code include one or more code extensions to the base application code, and one or more attributes, properties or rules that are specified other than by generating from the model;
storing the extended application code structure separately from the base application code;
exposing the base application code and extended application code structure for developer review, with a warning that the base application code may be regenerated;
accepting developer modifications to the base application code;
accepting developer modifications to the components of the extended application code structure;
accepting developer modifications to the model to provide a revised model; and
regenerating code by:
overwriting any developer modifications to the base application code by regenerating the base application code from the revised model; and
otherwise preventing any overwriting of the components of the extended application code structure after such developer modification are made to the components of the extended application code.

13. The system of claim 12 wherein the program instructions are further for:
generating base Application Programming Interface (API) code from the model;
generating an extended API code structure for subsequent placement of extended API code;
storing the extended API code structure separately from any base API code;
exposing the base API code and extended API code structure for developer review, with a warning that the base application code may be regenerated;
accepting developer modifications to the base API code;
accepting developer modifications to the extended API code structure, including extended API code;
regenerating the base API code from the revised model by:
overwriting any developer modifications to the base API code; and
otherwise preventing any overwriting of the API extended code after such developer modifications are made to the extended API code.

14. The system of claim 12 wherein the base application code implements an enterprise class application.

15. The system of claim 12 wherein the program instructions are further for:
   generating base user interface (UI) code from the model;
   generating an extended UI code structure for subsequent placement of extended UI code;
   storing the extended UI code structure separately from the base UI code;
   exposing the base UI code and extended UI code structure for developer review, with a warning that the base application code may be regenerated;
   accepting developer modifications to the base UI code;
   accepting developer modifications to the extended UI code structure, including extended UI code;
   regenerating the base UI code from the revised model by:
      overwriting any developer modifications to the base UI code; and
      otherwise preventing any overwriting of the UI extended code after such developer modifications are made to the extended UI code.

16. The system of claim 15 wherein at least some portion of the extended UI code is stored as a configuration file.

17. The system claim 15 wherein the program instructions are further for:
   automatically generating documentation related to at least the extended UI code from the model.

18. The system of claim 12 wherein the program instructions are further for:
   generating core code as common code shared across at least two other code tiers.

19. The system of claim 13 wherein the program instructions are further for:
   generating base API code from the model that comprises two or more different API methods.

20. The system of claim 19 wherein the different API methods are selected from GraphQL, REST or OData.

21. The system of claim 13 where the program instructions are further for:
   automatically generating documentation for the base API code from the model.

22. A system for generating code from a model of a data store, comprising:
   a computing platform having one or more processors and one or more computer readable memory devices;
   program instructions embodied by the one or more computer readable memory devices, the program instructions causing one or more of the processors, when executed, to generate the code by further:
   generating base application code from the model;
   generating an extended application code structure for subsequent placement of extended application code, wherein components of the extended application code include one or more code extensions to the base application code, and one or more attributes, properties or rules that are specified other than by generating from the model;
   storing the extended application code structure separately from the base application code;
   exposing the base application code and extended application code structure for developer review, with a warning that the base application code may be regenerated;
   accepting developer modifications to the base application code;
   accepting developer modifications to the extended application code structure;
   accepting developer modifications to the model to provide a revised model; and
   regenerating code by:
      overwriting any developer modifications to the base application code by regenerating the base application code from the revised model; and
      otherwise preventing any overwriting of the components of the extended application code structure after such developer modifications are made to the extended application code;
   and further comprising:
   generating base user interface (UI) code from the model;
   generating an extended UI code structure for subsequent placement of extended UI code;
   storing the extended UI code structure separately from any base UI code;
   exposing the base UI code and extended UI code structure for developer review, with a warning that the base application code may be regenerated;
   accepting developer modifications to the base UI code;
   accepting developer modifications to the extended UI code structure, including extended UI code;
   regenerating the base UI code from the revised model by:
      overwriting any developer modifications to the base UI code; and
      otherwise preventing any overwriting of the UI extended code after such developer modifications are made to the extended UI code;
   wherein at least some portion of the extended UI code is stored as a configuration file;
   wherein the program instructions are further for:
   generating a compiled representation from one or more of (a) the base application code, (b) extended application code, or (c) base UI code; and
   late binding of the extended UI code stored in the configuration file, by interpreting the configuration file when the compiled representation is executed.

* * * * *